US010277518B1

(12) United States Patent
Matthews et al.

(10) Patent No.: US 10,277,518 B1
(45) Date of Patent: Apr. 30, 2019

(54) INTELLIGENT PACKET QUEUES WITH DELAY-BASED ACTIONS

(71) Applicant: Innovium, Inc., San Jose, CA (US)

(72) Inventors: William Brad Matthews, San Jose, CA (US); Puneet Agarwal, Cupertino, CA (US); Ajit Kumar Jain, Cupertino, CA (US)

(73) Assignee: Innovium, Inc., San Jose, CA (US)

( * ) Notice: Subject to any disclaimer, the term of this patent is extended or adjusted under 35 U.S.C. 154(b) by 130 days.

(21) Appl. No.: 15/407,149

(22) Filed: Jan. 16, 2017

(51) Int. Cl.
*H04L 12/863* (2013.01)
*H04L 12/801* (2013.01)
*H04L 12/26* (2006.01)

(52) U.S. Cl.
CPC .......... *H04L 47/50* (2013.01); *H04L 43/0852* (2013.01); *H04L 43/16* (2013.01); *H04L 47/115* (2013.01); *H04L 47/12* (2013.01)

(58) Field of Classification Search
None
See application file for complete search history.

(56) References Cited

U.S. PATENT DOCUMENTS 6,011,805 A * 1/2000 Esteve ................. H04L 1/1803
370/252
2003/0152076 A1 8/2003 Lee et al.
2005/0007961 A1 1/2005 Scott et al.
2007/0028003 A1 * 2/2007 Rudkin .................. H04L 12/14
709/241
2009/0304014 A1 12/2009 Evans et al.
2014/0105025 A1 4/2014 Lavian et al.
2014/0219087 A1 * 8/2014 Matthews ........... H04L 47/2441
370/231

OTHER PUBLICATIONS

United States Patent and Trademark Office, U.S. Appl. No. 15/407,156, Notice of Allowance dated Jan. 24, 2019.
United States Patent and Trademark Office, U.S. Appl. No. 15/407,159, Non-Final Office Action dated Jan. 4, 2019.

* cited by examiner

*Primary Examiner* — Alex Skripnikov
(74) *Attorney, Agent, or Firm* — Wong & Rees LLP; Karl T. Rees

(57) ABSTRACT

A network device organizes packets into various queues, in which the packets await processing. Queue management logic tracks how long certain packet(s), such as a designated marker packet, remain in a queue. Based thereon, the logic produces a measure of delay for the queue, referred to herein as the "queue delay." Based on a comparison of the current queue delay to one or more thresholds, various associated delay-based actions may be performed, such as tagging and/or dropping packets departing from the queue, or preventing addition enqueues to the queue. In an embodiment, a queue may be expired based on the queue delay, and all packets dropped. In other embodiments, when a packet is dropped prior to enqueue into an assigned queue, copies of some or all of the packets already within the queue at the time the packet was dropped may be forwarded to a visibility component for analysis.

33 Claims, 8 Drawing Sheets

INTELLIGENT PACKET QUEUES WITH DELAY-BASED ACTIONS

TECHNICAL FIELD

Embodiments relate generally to network communication, and, more specifically, to techniques for managing queues of packets within a networking device.

RELATED CASES

This application is related to U.S. patent application Ser. No. 15/407,156, filed on the same date herewith, entitled "Intelligent Packet Queues with Enqueue Drop Visibility and Forensics," by Brad Matthews, et al., the entire contents of which are hereby incorporated by reference for all purposes as if fully set forth herein. This application is related to U.S. patent application Ser. No. 15/407,159, filed on the same date herewith, entitled "Intelligent Packet Queues with Efficient Delay Tracking," by Brad Matthews, et al., the entire contents of which are hereby incorporated by reference for all purposes as if fully set forth herein.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As data units are routed through different nodes in a network, the nodes may, on occasion, discard, fail to send, or fail to receive data units, thus resulting in the data units failing to reach their intended destination. The act of discarding a data unit, or failing to deliver a data unit, is typically referred to as "dropping" the data unit. Instances of dropping a data unit, referred to herein as "drops" or "packet loss," may occur for a variety of reasons, such as resource limitations, errors, or deliberate policies. In many cases, the selection of which data units to drop is sub-optimal, leading to inefficient and slower network communications.

Moreover, many devices in networks with complex topologies, such as switches in modern data centers, provide limited visibility into drops and other issues that can occur inside the devices. Such devices can often drop messages, such as packets, cells, or other data units, without providing sufficient information to determine why the messages were dropped.

For instance, it is common for certain types of nodes, such as switches, to be susceptible to "silent packet drops," where data units are dropped without being reported by the switch at all. Another common problem is known as a "silent black hole," where a node is unable to forward a data unit due to a lack of valid routing instructions at the node, such as errors or corruption in forwarding table entries. Another common problem is message drops or routing errors due to bugs in particular protocols.

Beyond dropping data units, a variety of other low visibility issues may arise in a node, such as inflated latency. Inflated latency refers to instances where the delay in transmission of a data unit exceeds some user expectation of target threshold.

BRIEF DESCRIPTION OF THE DRAWINGS

The present inventive subject matter is illustrated by way of example, and not by way of limitation, in the figures of the accompanying drawings and in which like reference numerals refer to similar elements and in which.

DETAILED DESCRIPTION

Figure 1:
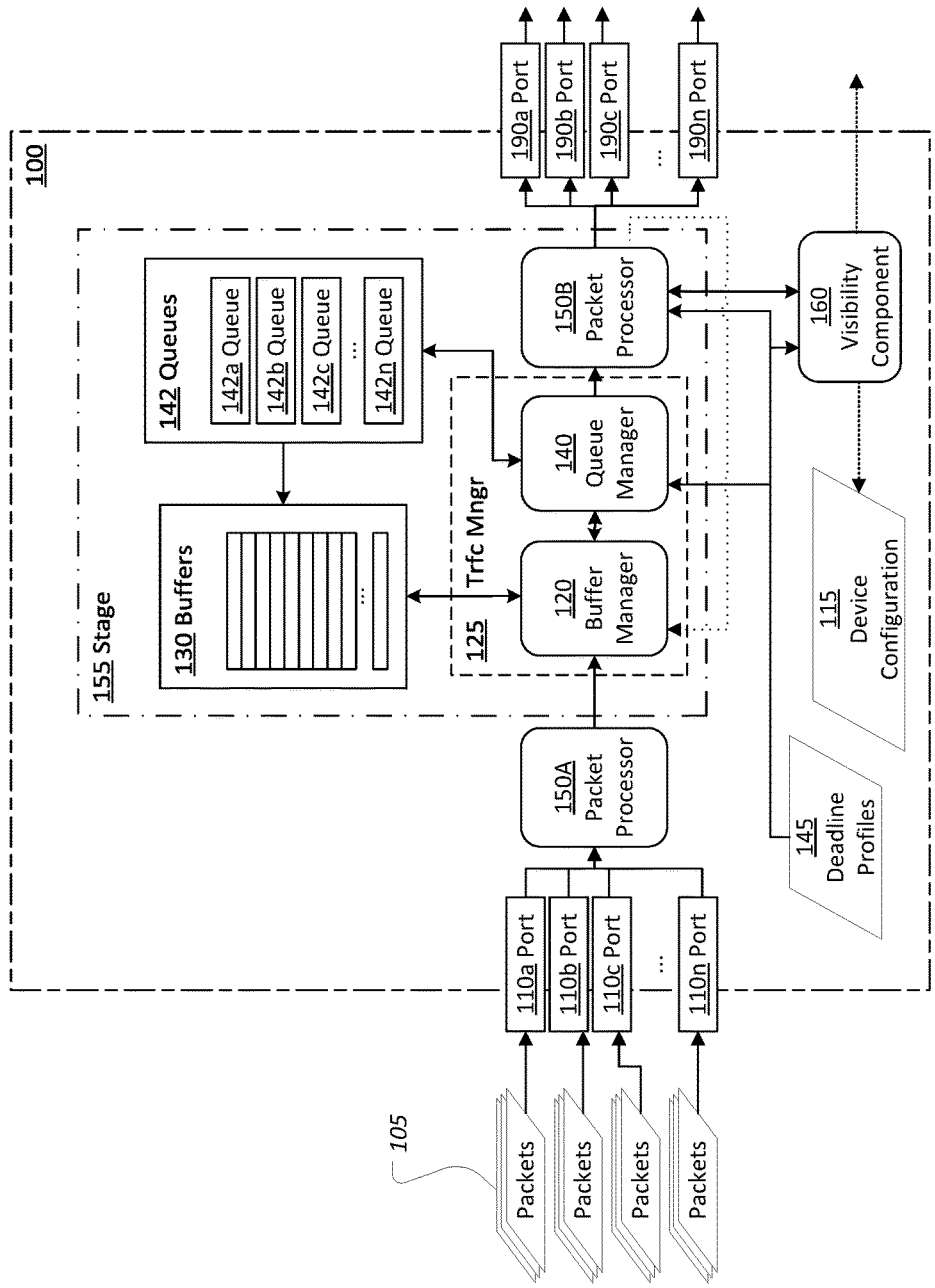
FIG. 1 is an illustrative view of various aspects of an example network device in which techniques described herein may be practiced.

In the following description, for the purposes of explanation, numerous specific details are set forth in order to provide a thorough understanding of the present inventive subject matter. It will be apparent, however, that the present inventive subject matter may be practiced without these specific details. In other instances, well-known structures and devices are shown in block diagram form in order to avoid unnecessarily obscuring the present inventive subject matter.

Embodiments are described herein according to the following outline:

1.0. General Overview
2.0. Structural Overview
2.1. Network
2.2. Ports
2.3. Packet Processing Components
2.4. Traffic Manager
2.5. Queue Assignment
2.6. Queue Manager
2.7. Visibility Component
2.8. Miscellaneous
3.0. Functional Overview
3.1. Packet Handling
3.2. Enqueue Process
3.3. Dequeue Process
3.4. Drop Visibility and Queue Forensics
4.0. Implementation Examples
4.1. Example Delay Tracking Use Case
4.2. Alternative Delay Tracking Techniques
4.3. Healing Engine
4.4. Annotations
5.0. Example Embodiments
6.0. Implementation Mechanism—Hardware Overview
7.0. Extensions and Alternatives

1.0. General Overview

Approaches, techniques, and mechanisms are disclosed for, among other aspects, improving the operation of a network device, particularly in situations that lead to, or are likely to lead to, packets being dropped or observations of excessive delays. The device organizes received packets into various queues, in which the packets await processing by associated processing component(s). Queues may be associated with, for instance, different sources, destinations, traffic flows, policies, traffic shapers, and/or processing components. Various logic within the device controls the rate at which packets are "released" from these queues for processing. A packet may pass through any number of queues before leaving a device, depending on the device's configuration and the properties of the packet.

According to an embodiment, queue management logic tracks how long certain packets remain in a queue, and produces a measure of delay for the queue, referred to herein as the "queue delay." In an embodiment, to avoid the potentially prohibitive expense of tracking the delay of each and every individual packet in the queue, certain packets within a queue may be designated as marker packets. The tracking may involve, for instance, tracking the delay of only a single marker packet in the queue at a given time, with the tail of the queue becoming the new marker packet when the marker packet finally leaves the queue. Or, as another example, the tracking may involve tracking delays for two or more marker packets. The queue delay is determined based on the marker packet(s). For example, the queue delay may be the amount of time since the oldest marker packet in the queue entered the queue.

In an embodiment, packets may be tagged with their respective queue delays as they leave their respective queues. In an embodiment, based on a comparison of the current queue delay to one or more thresholds, one or more delay-based actions associated with those threshold(s) may be performed. For instance, state variables associated with the queue may be modified. As another example, packets departing a queue may be tagged with delay classification tags that indicate to the next processing component that the packets should be treated in some special manner on account of the current queue delay. The thresholds may or may not vary depending on the queue and the delay-based action.

One example of such a tag may include, for instance, a delay monitoring tag that indicates that a copy of the packet and/or information about the packet, should be forwarded to a visibility component. Or, as another example, certain tagged packets may be mirrored to the visibility component. Based on the packets forwarded to it, the visibility component may be configured to, for instance, generate logs and reports to provide insight to a network analyst, perform various automated analyses, reconfigure the network device to increase performance, or perform other appropriate actions.

In yet another embodiment, rather than copying or mirroring a packet, a system may temporarily divert certain tagged packets through a visibility component before sending the packets out of the system. The visibility component may opt to update the packet with additional information, such as updated statistics related to the packet. Or, the visibility component may analyze the packet before sending the packet out, and pass configuration instructions or other information back to a packet processor based on the packet.

In an embodiment, delays above a certain threshold are determined to signify that a queue is experiencing excessive delay above a configured deadline. For example, different deadlines may correspond to different levels of delay. If a first deadline is passed, a first tag may be inserted into packets as they depart from the queue. If a second deadline is passed, a second tag may be inserted into packets as they depart from the queue. Any number of deadlines and associated tags may exist.

In an embodiment, delays above a certain threshold are determined to signify that an entire queue has expired. Consequently, the device may drop some or all of the packets within the queue without delivering the packets to their intended destination(s). Normal operations may then resume for the queue once the queue has been cleared, or once the delay has dropped below the threshold, depending on the embodiment. Expired packets may, in some embodiments, be tagged with additional information and diverted to a visibility component, or a copy thereof may be forwarded to the visibility component.

For example, as a result of delays greater than a certain length of time, the information within packets classified as belonging to a certain flow or having certain properties may be assumed to be no longer important to the intended destination of the packets. A queue comprised solely or predominately of traffic from the flow, or of traffic having the certain property, may therefore be associated with an expiration threshold based on the certain length of time. Whenever the queue delay exceeds the threshold, some or all of the packets within the queue simply expire, reducing unnecessary network communication and/or receiver processing of packets that in all likelihood are no longer needed by their respective destination(s).

In an embodiment, metadata associated with a queue and/or annotated to packets belonging in the queue may be utilized to provide greater insight into why a packet assigned to a queue may have been dropped before entering the queue. Such drops occur, for example, when a packet is assigned to a queue that has already exhausted its assigned buffers, a queue that has exceeded a rate at which it is permitted to accept new packets, a queue that has exceeded a class allocation threshold, and so forth. Rather than simply drop the packet, the device may divert the packet to a visibility component. Additionally, or alternatively, copies of some or all of the packets already within the queue at the time the packet was dropped may also be forwarded to the visibility component for analysis. The act of tagging packets in a queue (or associated with a port) to which an incoming packet was to be assigned, but was instead dropped, may also be referred to herein as queue forensics.

Certain techniques described herein facilitating debug of existing network devices. For example, in an embodiment, packets marked for visibility reasons, or copies thereof, are sent to a data collector for the purpose of debugging delay on a per hop basis.

In other aspects, the inventive subject matter encompasses computer apparatuses and/or computer-readable media configured to carry out the foregoing techniques. For convenience, many of the techniques described herein are described with respect to routing Internet Protocol (IP) packets in a Level 3 (L3) network, in which context the described techniques have particular advantages. It will be recognized, however, that these techniques may also be applied to realize advantages in routing other types of data units conforming to other protocols and/or at other communication layers within a network. Therefore, unless otherwise stated or apparent from context, the term "packet" as used herein should be understood to refer to any type of data unit involved in communications at any communication layer within a network, including cells, frames, or other datagrams.

2.0. Structural Overview

FIG. 1 is an illustrative view of various aspects of an example network device 100 in which techniques described herein may be practiced, according to an embodiment. Network device 100 is a computing device comprising any combination of hardware and software configured to implement the various logical components described herein, including components 110-190. For example, device 100 may be a single networking computing device, such as a router or switch, in which some or all of the processing components described herein are implemented using application-specific integrated circuits (ASICs) or field programmable gate arrays (FPGAs). As another example, the device 100 may include one or more memories storing instructions for implementing various components described herein, one or more hardware processors configured to execute the instructions stored in the one or more memories, and various data repositories in the one or more memories for storing data structures utilized and manipulated by the various components.

2.1. Network

Network device 100 is a node within a network (not depicted). A computer network or data network is a set of computing components, including devices such as device 100, interconnected by communication links. Each computing component may be a separate computing device, such as, without limitation, a hub, switch, bridge, router, server, gateway, or personal computer, or a component thereof. Each computing component is considered to be a node within the network. A communication link is a mechanism of connecting at least two nodes such that each node may transmit data to and receive data from the other node. Such data may be transmitted in the form of signals over transmission media such as, without limitation, electrical cables, optical cables, or wireless media.

The structure and transmission of data between nodes is governed by a number of different protocols. There may be multiple layers of protocols, typically beginning with a lowest layer such as a "physical" layer that governs the transmission and reception of raw bit streams as signals over a transmission medium. Each layer defines a data unit (the protocol data unit, or "PDU"), with multiple data units at one layer combining to form a single data unit in another. Additional examples of layers may include, for instance, a data link layer in which bits defined by a physical layer are combined to form a frame or cell, a network layer in which frames or cells defined by the data link layer are combined to form a packet, and a transport layer in which packets defined by the network layer are combined to form a TCP segment or UDP datagram. The Open Systems Interconnection model of communications describes these and other layers of communications. However, other models defining other ways of layering information may also be used. The Internet protocol suite, or "TCP/IP stack," is one example of a common group of protocols that may be used together over multiple layers to communicate information. However, techniques described herein may have application to other protocols outside of the TCP/IP stack.

A given node in a network may not necessarily have a link to each other node in the network, particularly in more complex networks. For example, in wired networks, each node may only have a limited number of physical ports into which cables may be plugged to create links. Certain "terminal" nodes—often servers or end-user devices—may only have one or a handful of ports. Other nodes, such as switches, hubs, or routers, may have a great deal more ports, and typically are used to relay information between the terminal nodes. The arrangement of nodes and links in a network is said to be the topology of the network, and is typically visualized as a network graph or tree.

A node implements various forwarding logic by which it is configured to determine how to handle each data unit it receives. This forwarding logic may, in some instances, be hard-coded. For instance, specific hardware or software within the node may be configured to always react to certain types of data units in certain circumstances in a certain way. This forwarding logic may also be configurable, in that it changes over time in response to instructions or data from other nodes in the network. For example, a node will typically store in its memories one or more forwarding tables (or equivalent structures) that map certain data unit attributes or characteristics to actions to be taken with respect to data units having those attributes or characteristics, such as sending the data unit to a selected path, or processing the data unit using a specified internal component.

When a node receives a data unit, it typically examines addressing information within the data unit (and/or other information within the data unit) to determine how to process the data unit. The addressing information may be, for instance, an Internet Protocol (IP) address, MPLS label, or any other suitable information. If the addressing information indicates that the receiving node is not the destination for the data unit, the node may look up the destination node within receiving node's routing information and route the data unit to another node connected to the receiving node based on forwarding instructions associated with the destination node (or an address group to which the destination node belongs). The forwarding instructions may indicate, for instance, an outgoing port over which to send the message, a label to attach the message, etc. In cases where multiple paths to the destination node are possible, the forwarding instructions may include information indicating a suitable approach for selecting one of those paths, or a path deemed to be the best path may already be defined.

Addressing information, flags, labels, and other metadata used for determining how to handle a data unit is typically embedded within a portion of the data unit known as the header. The header is typically at the beginning of the data unit, and is followed by the payload of the data unit, which is the information actually being sent in the data unit. A header is typically comprised of fields of different types, such as a destination address field, source address field, destination port field, source port field, and so forth. In some protocols, the number and the arrangement of fields may be fixed. Other protocols allow for arbitrary numbers of fields, with some or all of the fields being preceded by type information that explains to a node the meaning of the field.

A traffic flow is a sequence of data units, such as packets, from a source computer to a destination. The source of the traffic flow marks each data unit in the sequence as a member of the flow using a label, tag, or other suitable identifier within the data unit (e.g. in the header). As an example, an "five-tuple" value formed from a combination of a source address, destination address, source port, destination port, and protocol may be used to identify a flow. A flow is, for many network protocols (e.g. TCP/IP), often intended to be sent in sequence, and network devices are therefore typically configured to send all data units within a given flow along a same path to ensure that the flow is received in sequence.

2.2. Ports

Network device 100 includes ports 110/190. Ports 110, including ports 110a-n, are inbound ("ingress") ports by which packets 105 are received over the network. Ports 190, including ports 190a-n, are outbound ("egress") ports by which at least some of the packets 105 are sent out to other destinations within the network, after having been processed by the network device 100.

Ports 110/190 are depicted as separate ports for illustrative purposes, but may actually correspond to the same physical hardware ports on the network device 110. That is, a network device 100 may both receive packets 105 and send packets 105 over a single physical port, and the single physical port may thus function as both an ingress port 110 and egress port 190. Nonetheless, for various functional purposes, certain logic of the network device 100 may view a single physical port as a separate ingress port 110 and egress port 190. Moreover, for various functional purposes, certain logic of the network device 100 may subdivide a single ingress port 110 or egress port 190 into multiple ingress ports 110 or egress ports 190, or aggregate multiple ingress ports 110 or multiple egress ports 190 into a single ingress port 110 or egress port 190. Hence, in various embodiments, ports 110 and 190 should be understood as distinct logical constructs that are mapped to physical ports rather than simply as distinct physical constructs.

2.3. Packet Processing Components

Device 100 comprises various packet processing components 150. A packet processing component 150 may be or include, for example, a Field Programmable Gate Array (FPGA), Application-Specific Integrated Circuit (ASIC), or a general purpose processor executing software-based instructions. The packet processor 150 reads or accepts packets 105 as input, and determines how to handle the packets 105 based on various logic implemented by the packet processor 150. In an embodiment, a first set of one or more packet processing components 150 may form a RX component (or pre-buffer manager), and a second set of one or more packet processing components 150 may form a TX component (or post-queue manager).

A packet processing component 150 is configured to perform one or more processing tasks with a packet 105. By way of example, such tasks may include, without limitation, sending the packet 105 out a specified port 190, applying rules or policies to the packet (e.g. traffic flow control, traffic shaping, security, etc.), manipulating the packet 105, discarding a packet 105, locating forwarding information for a packet 105, annotating or tagging a packet, or simply determining a next processing component 150 to which the packet 105 should be sent.

In some embodiments, device 100 comprises many processing components 150, potentially working in parallel, some or all of which may be configured to perform different tasks or combinations of tasks. In other embodiments, a single processor component 150 may be tasked with performing all of the processing tasks supported by the device 100, using branching logic based on the contents of a packet 105 and the context (e.g. the queue 142 in which the packet 105 is found) by which the packet 105 arrived at the packet processor 150.

As depicted, the packet processors 150 in device 100 include both processors 150A dedicated to pre-processing packets 105 before the packets 105 are queued, and processors 150B, dedicated to processing packets 105 after those packets depart from queues 142. Pre-processing packet processors 150A may, for example, perform tasks such as determining which queue 142 to place a packet 105 in while post-processing packet processors 150B may be configured other tasks already described. However, depending on the embodiment, pre-processing packet processors 150A may further be configured to perform other suitable tasks, such as resolving a destination of packet 105.

In an embodiment, by means of the arrangement of packet processing components 150 and other components of device 100, device 100 may be configured to process a packet 105 in a series of stages 155, each stage involving a different set of one or more packet processors 150, or at least a different branch of packet processor 150 logic. Although only one stage 155 is depicted, the processing may occur over any number of stages. Instead of the output of the first stage 155 being fed to ports 190, the output of each stage 155 is fed to the input of a next stage 155 in the series, until a concluding stage 155 where output is finally provided to ports 190. The collective actions of the processing component(s) 150 of the device 100 over these multiple stages 155 are said to implement the forwarding logic of the device 100.

For example, in an embodiment, a packet 105 may pass from an ingress port 110 to an ingress stage 155, where it is processed in succession by an ingress pre-processor 150A, ingress buffer manager 120, ingress queue manager 140, and a processor 150B. Processor 150B may then pass the packet 105 on to an egress stage 155 by assigning packet 105 to a new queue 142 for processing by an egress buffer manager 120, followed by an egress queue manager 140 and finally another packet processor 150B, which sends the packet 105 out on a port 190.

In the course of processing a packet 105, a device 100 may replicate a packet 105 one or more times. For example, a packet 105 may be replicated for purposes such as multicasting, mirroring, debugging, and so forth. Thus, a single packet 105 may be replicated to multiple queues 142. Hence, though certain techniques described herein may refer to the original packet 105 that was received by the device 100, it will be understood that those techniques will equally apply to copies of the packet 105 that have been generated for various purposes.

Tags

A packet processor 150, and/or other components described herein, may be configured to "tag" a packet 105 with labels referred to herein as tags. A packet 105 may be tagged for a variety of reasons, such as to signal the packet 105 as being significant for some purpose related to the forwarding logic and/or debugging capabilities of the device. A packet may be tagged by, for example, inserting a label within the header of the packet 105, linking the packet 105 to a label with sideband data or a table, or any other suitable means of associating a packet 105 with a tag.

A packet processor 150 may likewise be configured to look for tags associated with a packet 105, and take some special action based on the detecting an associated tag. The packet processor 150 may send a tag along with a packet 105 out of the device 100, or the tag may be consumed by the device 100 internally, for example by a packet processor 150, statistics engine, CPU, etc. and not sent to external consumers, depending on the embodiment.

2.4. Traffic Manager

Device 100 comprises a traffic manager 125 configured to manage packets 105 while they are waiting for processing. Traffic manager 125 more particularly manages packets 105 utilizing structures referred to as buffers 130 and queues 142.

Buffers

Since not all packets 105 received by the device 100 can be processed by the packet processor(s) 150 at the same time, device 100 may store packets 105 in temporary memory structures referred to as buffers 130 while the packets 105 are waiting to be processed. For example, the device's packet processors 150 may only be capable of processing a certain number of packets 105, or portions of packets 105, in a given clock cycle, meaning that other packets 105, or portions of packets 105, must either be ignored (i.e. dropped) or stored. At any given time, a large number of packets 105 may be stored in the buffers 130 of the device 100, depending on network traffic conditions.

A buffer 130 may be a portion of any type of memory, including volatile memory and/or non-volatile memory. Traffic manager 125 includes a buffer manager 120 configured to manage use of buffers 130 by device 100. Among other processing tasks, the buffer manager 120 may, for example, allocate and deallocate specific segments of memory for buffers 130, create and delete buffers 130 within that memory, identify available buffer(s) 130 in which to store a newly received packet 105, maintain a mapping of buffers 130 to packets 105 stored in those buffers 130 (e.g. by a packet sequence number assigned to each packet 105 as the packet 105 is received), mark a buffer 130 as available when a packet 105 stored in that buffer 130 is dropped or sent from the device 100, determine when to drop a packet 105 instead of storing the packet 105 in a buffer 130, and so forth.

Queues

A packet 105, and the buffer(s) 130 in which it is stored, is said to belong to a construct referred to as a queue 142, represented as queues 142a-142n. A queue 142 may be a distinct, continuous portion of the memory in which buffers 130 are stored. Or, a queue 142 may instead be a set of linked memory locations (e.g. linked buffers 130). In some embodiments, the number of buffers 130 assigned to a given queue 142 at a given time may be limited, either globally or on a per-queue basis, and this limit may change over time.

As described in other sections, device 100 may process a packet 105 over one or more stages. A node may have many queues 142, and each stage of processing may utilize one or more of the queues 142 to regulate which packet 105 is processed at which time. To this end, a queue 142 arranges its constituent packets 105 in a sequence, such that each packet 105 corresponds to a different node in an ordered series of nodes. The sequence in which the queue 142 arranges its constituent packets 105 generally corresponds to the sequence in which the packets 105 in the queue 142 will be processed.

For instance, a queue 142 may be a first-in-first-out ("FIFO") queue. A FIFO queue has a head node, corresponding to the packet that has highest priority (e.g. the next packet to be processed, and typically the packet that was least recently added to the queue). A FIFO queue further has a tail node, corresponding to the packet that has lowest priority (e.g. the packet that was most recently added to the queue). The remaining nodes in the queue are arranged in a sequence between the head node and tail node, in decreasing order of priority (e.g. increasing order of how recently the corresponding packets were added to the queue).

2.5. Queue Assignment

Forwarding logic within device 100, such as in packet processor 150A or 150B, is configured to assign packets 105, or copies of packets 105, to queues 142. A packet 105 (or a copy thereof) is assigned to a queue 142 upon reception of a packet 105 via an ingress port 110, or at various other times, such as when a packet processor 150B forwards a packet 105 for additional processing by another component 150. For example, the forwarding logic may resolve various attributes (QoS, ingress port 110, etc.) of the packet 105 to a specific queue 142, and then forward the information to traffic manager 125 for storing the packet 105 and assigning a queue 142.

Device 100 may comprise various assignment control logic by which the queue 142 to which a packet 105 should be assigned is identified. In an embodiment, different queues 142 may have different purposes. For example, if the packet 105 has just arrived in the device 100, the packet 105 might be assigned to a queue 142 designated as an ingress queue 142, while a packet 105 that is ready to depart from the device 100 might instead be assigned to a queue 142 that has been designated as an egress queue 142.

Similarly, different queues 142 may exist for different destinations. For example, each port 110 and/or port 190 may have its own set of queues 142. The queue 142 to which an incoming packet 105 is assigned may therefore be selected based on the port 110 through which it was received, while the queue 142 to which an outgoing packet is assigned may be selected based on forwarding information indicating which port 190 the packet should depart from. As another example, each packet processor 150 may be associated with a different set of one or more queues 142. Hence, the current processing context of the packet 105 may be used to select which queue 142 a packet 105 should be assigned to.

In an embodiment, there may also or instead be different queues 142 for different flows or sets of flows. That is, each identifiable traffic flow or group of traffic flows is assigned its own set of queues 142 to which its packets 105 are respectively assigned. In an embodiment, different queues 142 may correspond to different classes of traffic or quality-of-service (QoS) levels. Different queues 142 may also or instead exist for any other suitable distinguishing property of the packets 105, such as source address, destination address, packet type, and so forth.

In some embodiments, after each of the foregoing considerations, there may be times when multiple queues 142 still exist to which a packet 105 could be assigned. For example, a device 100 may include multiple similarly configured processors 150 that could process a given packet 105, and each processor 150 may have its own queue 142 to which the given packet 105 could be assigned. In such cases, the packet 105 may be assigned to a queue 142 using a round-robin approach, using random selection, or using any suitable load balancing approach. Or, the eligible queue 142 with the lowest queue delay or lowest number of assigned buffers may be selected. Or, the assignment mechanism may use a hash function based on a property of the packet 105, such as the destination address or a flow identifier, to decide which queue 142 to assign the packet 105 to. Or, the assignment mechanism may use any combination of the foregoing and/or other assignment techniques to select a queue 142 for a packet 105.

In some embodiments, a packet 105 may be assigned to multiple queues 142. In such an embodiment, the packet 105 may be copied, and each copy added to a different queue 142.

Dropping Packets

In some embodiments, there may be times when various rules indicate that a packet 105, or a copy of the packet 105, should not be added to a queue 142 to which the packet 105 is assigned. In an embodiment, the device 100 may be configured to reassign such a packet 105 to another eligible queue 142, if available. In another embodiment, the device 100 may instead be configured to drop such a packet 105 or a copy of the packet 105. Or, in yet other embodiments, the device 100 may be configured to decide between these options, and/or ignoring the rule, depending on various factors.

For example, in certain embodiments, a queue 142 may be marked as expired as a result of techniques described in other sections. In one such embodiment, if the queue 142 to which device 100 assigns a packet 105 is expired, then the device 100 may drop the packet 105, or copy of the packet 105, or take other action as explained herein.

As another example, as mentioned, in an embodiment, only a certain number of buffers 130 may be allocated to a given queue 142. Buffer manager 120 may track the number of buffers 130 currently consumed by a queue 142, and while the number of buffers 130 consumed meets or exceeds the number allocated to the queue 142, device 100 may drop any packet 105 that it assigns to the queue 142.

As yet another example, queue manager 140 may prohibit packets 105 from being added to a queue 142 at a certain time on account of restrictions on the rate at which packets 105 may be added to a queue 142. Such restrictions may be global, or specific to a queue, class, flow, port, or any other property of a packet 105. Device 100 may additionally or alternatively be configured to follow a variety of other such rules, indicating when a packet 105 should not be added to a queue 142, and the techniques described herein are not specific to a specific rule unless otherwise stated.

The device 100 may optionally maintain counters that are incremented whenever it drops a packet. Different counters may be maintained for different types of drop events and/or different ports, services, classes, flows, or other packet properties. For example, the buffer manager 120 may maintain counters on a per-port basis that track drops to expired queues. The buffer manager 120 may also or instead set a "sticky bit" for queues for which drop events occur, such as an "expired queue drop" sticky bit. Such data may be reported, for example, to a device administrator, and/or utilized to automatically reconfigure the device configuration 115 of the network device 100 to potentially reduce such drops in the future.

2.6. Queue Manager

Traffic managers 125 comprises a queue manager 140 that manages queues 142. Queue manager 140 is coupled to buffer manager 120, and is configured to receive, among other instructions, instructions to add specific packets 130 to specific queues 142. In response to an instruction to add a packet 105 to a queue 142, queue manager 140 is configured to add ("enqueue") the packet 105 in the specified queue 142 by placing the packet 105 at the tail of the queue 142.

Queue manager 140 is further coupled to packet processor(s) 150. At various times, queue manager 140 schedules the dequeue (release) of a packet or segment of a packet at the head of the queue, and provides the packet 105 or segment (typically by reference) to a corresponding packet processor 150. Queue manager 140 may determine to release a packet in a variety of manners, depending on the embodiment. For example, queue manager 140 may wait until a packet 105 is requested by a packet processor 150. Or, queue manager 140 may automatically release a packet 105 from a queue at designated intervals (e.g. once per clock cycle). Or, queue manager 140 may include resource management logic by which queue manager 140 prioritizes queues 142 and selects a certain number of packets 105 to release each clock cycle based on a variety of factors. Some factors in this prioritization may include weight, priority, delay, queue length, port length, etc.

Queue manager 140 may dequeue packets 105 in response to yet other events in other embodiments. In an embodiment, queue manager 140 may comprise a scheduler that determines a schedule, for a certain amount of time in advance, of when packets 105 should be dequeued from specific queues 142. Queue manager 140 may then dequeue packets 105 in accordance to the schedule.

In an embodiment, the queue manager may be blocked from dequeueing a queue 142 at certain times (even if the queue 142 is scheduled for dequeueing) due to various factors. For example, there may be flow control restrictions on ports, port groups, queues, or other constructs associated with the queue or packet. Or, there may be flow control restrictions on specific internal components, such as specific packet processors 150, port buffers, etc.

The techniques described herein are not specific to any particular mechanism for determining when queue manager 140 decides to dequeue a packet 105 from a queue 142.

Queue Delay

In an embodiment, queue manager 140 is further configured to track one or more measures of delay, associated with each queue 142. For example, the queue manager 140 may be configured to track a timestamp of when a packet 105 entered a queue 142 (the "enqueue time") and compute the amount of time the packet 105 has been in the queue 142 (the "packet delay") based on the difference between the enqueue time and the current time.

A queue delay may be computed for each queue 142 based on a packet delay of one of the packets 105 within the queue 142. For example, in some embodiments, the packet delay of each packet 105 within the queue may be tracked, and the queue 142 may be said to have a queue delay equal to the packet delay of the packet 105 at the head of the queue 142. In other embodiments, the packet delay is tracked only for one or more designated "marker" packets 105, thus avoiding the need to track timestamps for all packets 105 within the queue. The queue delay is said to be equal to the delay of the most recently dequeued marker packet 105, or the longest duration of time for which a current marker packet 105 has been observed to be in the queue 142 (whichever is largest).

In an embodiment, as one maker packet 105 leaves the queue 142, the packet 105 at the tail of the queue 142 is designated as a new marker packet 105. In this manner, the queue delay may be tracked simply by tracking an identifier of the marker packet 105, a timestamp of the marker packet 105, an identifier of the tail packet 105, and a timestamp of the tail packet 105. In other embodiments, similar techniques may be utilized to reduce the overhead of tracking a marker packet 105. In an embodiment with multiple marker packets 105 per queue, there may be a maximum number of marker packets 105 per queue 142, and the tail packet 105 may become the marker packet 105 under certain conditions, such as the passage of a certain amount of time, the additional of a certain number of packets 105 to the queue 142, the departure of a marker packet 105 from the queue 142, or any combination thereof.

In an embodiment, there may be different types of queue delays. For instance, there may be a tail queue delay corresponding to the current packet delay of the packet 105 at the tail of the queue 142, and a marker queue delay corresponding to the current packet delay of the oldest marker packet 105. Or, the queue delay may be a function of multiple packet delays (e.g. the average or weighted average of packet delays for multiple packets 105 within the queue).

In an embodiment, the queue manager 140 only calculates queue delay at certain refresh times. The queue delay is then stored with the data describing the queue 142. The queue delay thus need not accurately reflect the packet delay of a packet 105 at a given time, but rather reflects the packet delay as of the last refresh time.

For instance, a background process may cycle through each queue 142 at various intervals and update the queue delay of the queue 142. The background process may, for example, refresh the queue delay for a certain number of queues 142 per clock cycle. The queues 142 may be selected using a round robin approach, or using some prioritization scheme. The queue manager 140 may also or instead refresh the queue delay for a queue 142 whenever dequeuing a packet 105 from the queue 142.

To conserve resources, queue manager 140 need not track delay for all queues 142. For example, queue manager 140 may only track delay for certain types of queues 142 (e.g. only egress queues 142 or only queues 142 with a certain QoS level), and/or for queues 142 for which delay-based actions have been enabled.

Delay-Based Actions

According to an embodiment, queue manager 140 may be configured to take one or more actions based on the current queue delay of a queue 142. For example, in an embodiment, queue manager 140 may tag or otherwise annotate a packet 105 with information indicating the queue delay, or at least a categorization of the queue delay.

In an embodiment, certain delay-based actions may be associated with a corresponding delay thresholds. The queue manager 140 compares to the current queue delay measure of the queue 142 to each applicable threshold. If a threshold is exceeded, a corresponding action is taken. Such thresholds may be fixed for all queues 142, specific to certain types of queues 142, or set on a per-queue basis.

Furthermore, the thresholds may change over time. In an embodiment, thresholds may change dynamically based on the state of the device. For example, threshold management logic may lower deadline thresholds as the total amount of buffers in the device increases. Also, the thresholds may change based on the fill level across a set of queues or physical ports or logical ports.

In some embodiments, not all packets 105 in a queue 142 are necessarily subject to delay-based actions, even when the corresponding threshold is met. For example, a packet processor 150 may mark certain packets 105 as actionable (or, inversely, unactionable). When a threshold is met, any corresponding delay-based actions may only be applied to packets 105 marked by as being actionable, rather than to all packets 105.

One example of a delay-based action is delay-based visibility monitoring. Whenever the queue delay of a queue 142 exceeds a corresponding delay-based visibility monitoring threshold, thereby signaling a level of excessive delay, the queue manager 140 tags packets 105 as they depart from the queue 142 with a certain tag, such as "DELAY_VISIBILITY_QUEUE_EVENT." Optionally, the queue manager 140 may also update a queue state variable to indicate that delay-based visibility monitoring is currently active for the queue 142. Certain packet processing component(s) 150 within and/or outside of the device 100 may be configured to take various actions whenever detecting a packet 105 having this delay visibility tag. For instance, a packet processor 150 may forward a full or partial copy of the packet, optionally injected with additional information as described elsewhere in the disclosure, to a special visibility component 160.

There may be any number of delay-monitoring thresholds, associated with different deadlines or tags. Each threshold may be associated with a different application target and further indicate the severity of the delay (e.g. high, medium, low, etc.). Metrics associated with the delay may furthermore be included in the tag. The tag may be used, for example, to identify packets to analyze when debugging network performance for the application.

Another example of a delay-based action is queue expiration. When the queue delay of a queue 142 exceeds a corresponding expiration threshold, the queue 142 is marked as expired (e.g. using an expiration state variable associated with the queue 142). The queue 142 is then "drained" of some or all of the packets 105 within the queue 142. The number of packets 105 that are drained depends on the embodiment and/or the queue delay, and may include all packets 105, a designated number of packets 105, or just packets 105 that are dequeued while the queue delay remains above the threshold. Draining may be performed through normal scheduling to get access to buffer bandwidth, or draining may be performed via an opportunistic background engine.

As these "drained" packets 105 are dequeued, they may be completely dropped, or diverted to a special visibility component 160 for processing without being forwarded to their intended destination. Optionally, the packets 105 are tagged with a certain tag, such as "EXPIRED_QUEUE_EVENT." Moreover, in an embodiment, enqueues to the queue 142 may be restricted or altogether forbidden while the queue 142 is marked as expired. The queue is marked as unexpired once its packets 105 are completely drained, or the queue delay falls below the expiration threshold again.

According to an embodiment, in response to queue expiration, device 100 may be configured to adjust various device configuration settings 115. For instance, flow control and traffic shaping settings related to a queue 142 may be temporarily overridden while the queue 142 is expired.

A variety of other delay-based actions are also possible, depending on the embodiment. As a non-limiting example, in an embodiment, if a certain threshold is exceeded, a packet 105 may be annotated as the packet is dequeued. The packet 105 may be annotated to include, for example, any of a variety of metrics related to the queue 142, such as the current delay associated with the queue 142, the current system time, the identity of the current marker packet 105, an identifier of the queue 142, a size of the queue 142, and so forth. The packet 105 may also or instead be annotated with any other suitable information.

In an embodiment, queue manager 140 may be configured to take delay-based actions only if the capability to perform that action is enabled for the queue 142. For instance, for one or more delay-based actions (e.g. queue expiration, delay monitoring, etc.), a queue 142 may have a flag that, when set, instructs the queue manager 140 to perform the delay-based action when the corresponding threshold is exceeded. Otherwise, the queue manager 140 need not compare the queue delay to the corresponding threshold, or even track queue delay if no other delay-based actions are enabled. As another example, the threshold for the queue 142 itself may indicate whether the capability to perform delay-based action is enabled. A threshold having a negative or otherwise invalid value, for instance, may indicate that the delay-based action is disabled. In an embodiment, delay-based actions are disabled by default and only enabled for certain types of queues 142 and/or in response to certain types of events.

In an embodiment, a deadline profile 145 may describe a threshold and its associated delay-based action, or a set of thresholds and their respectively associated delay-based actions. Device 100 may store a number of deadline profiles 145, each having a different profile identifier. For example, one profile 145 might set an expiration threshold of 300 ns and a delay visibility monitoring threshold of 200 ns, while another profile 145 might set thresholds of 150 ns and 120 ns, respectively. Each queue 142 may be associated with one of these deadline profiles 145, and the threshold(s) applicable to that queue 142 may be determined from the associated profile 145.

The profile 145 associated with a given queue 142 may change over time due to, for example, changes made by a visibility component 160 or configuration component of the device 100. Moreover, the profiles 145 themselves may change dynamically over time on account of the state of the device, as described elsewhere.

In an embodiment, the device 100 may include various mechanisms to disable queue expiration functionality. For example, there may be a flag that is provided with a packet 105 to indicate the packet 105 that should not be expired. As another example, there may be a certain pre-defined threshold whereby, once the delay for a packet 105 in an expired queue 142 falls below a given target, the queue 142 is no longer considered to be expired and the packet 105 is processed normally.

Drop Visibility and Queue Forensics

According to an embodiment, when a packet 105 assigned to a queue 142 is dropped before entering the queue 142, the queue manager 140 may store data indicating that a drop visibility event has occurred, thus potentially enabling queue forensics for the queue 142 (depending on the configuration of the queue 142 and/or device). For instance, buffer manager 120 may send data to queue manager 140 identifying a specific queue 142 to which a dropped packet 105 was to be assigned. The queue manager 140 may then tag some or all packets 105 that were in the queue 142 at the time the drop occurred with a certain forensics tag, such as "ENQ_DROP_VISIBILITY_QUEUE_EVENT." Such a tag may, for example, instruct a processing component 150 to forward a complete or partial copy (e.g. with the payload removed) of each tagged packet 105 to a special visibility queue 142, from which a special visibility component 160 may inspect the contents of the queue 142 at the time of the drop so as to identify possible reasons for the drop event to have occurred.

In an embodiment, instead of being dropped completely, the packet 105 may likewise be forwarded to the special visibility queue 142 and provided with a drop visibility tag. For instance, the packet 105 may be linked to a special visibility queue 142, or even the original queue 142, and include a special tag indicating that a problem was encountered when trying to assign the packet 105 to the queue. In an embodiment, the packet 105 that could not be added may be truncated such that only the header and potentially a first portion of the payload are sent to the downstream logic.

Moreover, in an embodiment, each tagged packet 105 may also be tagged with information by which packets 105 that were in the queue 142 at the time the drop event occurred may be correlated to the dropped packet 105. Such information may include, for instance, a queue identifier, packet identifier, drop event identifier, timestamp, or any other suitable information. In this manner, device 100 has the ability to provide visibility into the drop event by (1) capturing the packet 105 being dropped and (2) capturing the contents of the queue 142 to which the dropped packet 105 would have been enqueued had it been admitted, thus allowing an administrative user or device logic to analyze what other traffic was in the device 100 that may have led to drop. The act of tagging the packets 105 in a queue 142 at the time a drop event occurs is also referred to herein as queue forensics.

In an embodiment, rather than immediately tag all packets 105 in a queue 142 with a forensics tag, the packet identifier of the tail packet 105 within the queue 142 may be recorded. As the packets 105 within the queue 142 depart, they are each tagged in turn, until the packet 105 having the recorded packet identifier finally departs from the queue 142. The tagging then ceases, and the recorded identifier may be erased.

According to an embodiment, one or both of the drop visibility and queue forensics features may be enabled or disabled on a per-queue, per-physical-port, per-logical-port, or other basis. For example, each queue may include a flag that, when set, enables the above functionality to occur. In an embodiment, drop visibility and/or queue forensics may automatically be enabled for a port, for at least a certain amount of time, if a drop occurs upon enqueue to a queue 142 associated with the port or with respect to a packet 105 that was received via the port.

In an embodiment, drop visibility and/or queue forensics may be provided for all packets 105 that cannot be added to their assigned queues 142, or only to a probabilistically selected subset of such packets 105. For example, when dropping a packet, device 100 may execute a probabilistic sampling function to determine whether to enable drop visibility reporting and/or queue forensics with respect to the drop event. Such a function may randomly select, for instance, a certain percentage of drop events for visibility reporting over time (e.g. 5 randomly selected events out of every 100 events). In an embodiment, a rate-aware sampling function may be utilized. Rather than simply randomly selecting a certain percentage of drop events, a percentage of drop events are selected such that a cluster or set of consecutive drop events are reported, thus allowing better insight into a sequence of events that resulted in a drop (e.g. 5 consecutive drop events may be selected out of every 100 events).

Example Queue Data

Figure 2:
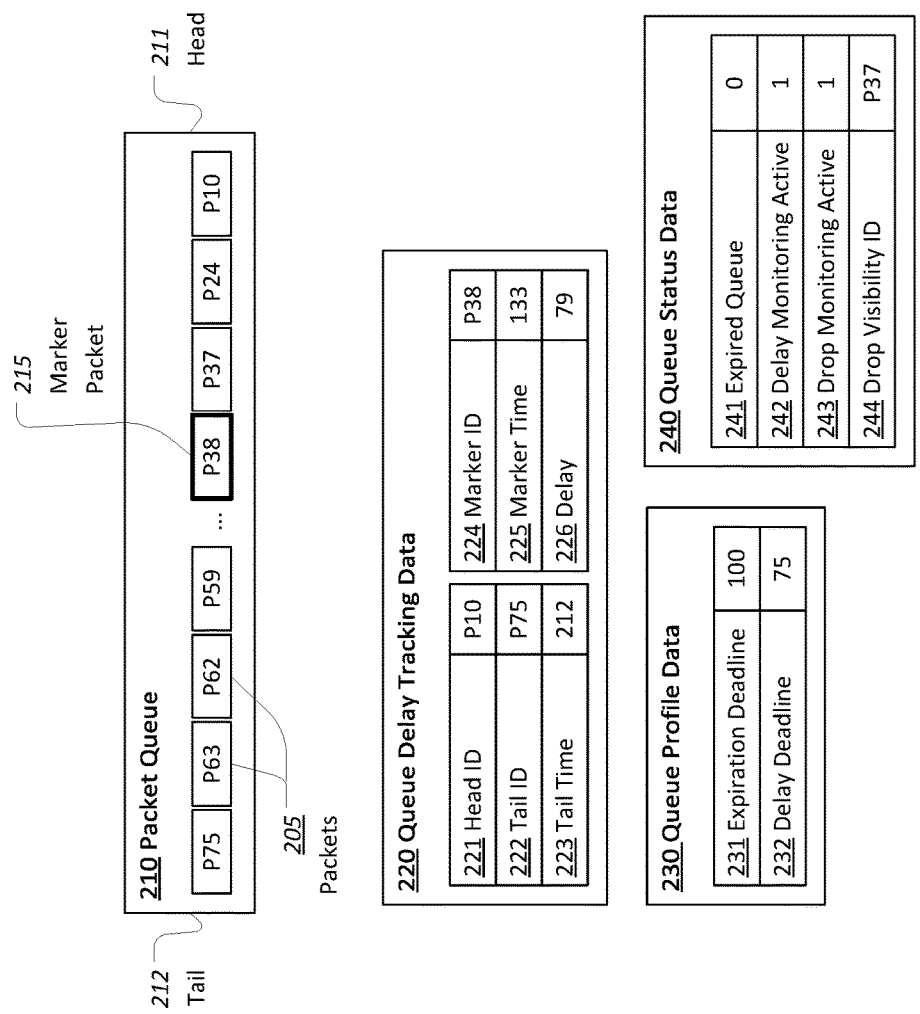
FIG. 2 illustrates example data structures that may be utilized to describe a queue.

Queue manager 140 stores data describing each queue 142, as well as the arrangement of packets 105 in each queue 142. FIG. 2 illustrates example data structures 200 that may be utilized to describe a queue, such as a queue 142, according to an embodiment. The various fields of queue data 200 may be stored within any suitable memory, including registers, RAM, or other volatile or non-volatile memories.

For instance, queue data 200 may include queue arrangement data 210 that indicates which packets 205 are currently in the queue. Each packet 205 is indicated by a packet identifier, which may be, for example, an address of the packet 205 within a memory (e.g. the buffer address), a packet sequence number, or any other identifying data. Queue arrangement data 210 further indicates the position of each of the packets 205 within the queue 200, including a tail 212 of the queue 200, at which new packets are enqueued, as well as a head 211 of the queue 200 at which packets are dequeued. The exact structure used to describe the arrangement of the packets 105 in a queue 142 may vary depending on implementation, but may be, without limitation, a linked list or ordered array of packet identifiers, position numbers associated with the packets 205 or packet identifier, and so forth.

Queue data 200 may further include queue delay tracking data 220. Queue delay tracking data 220 may optionally include, for convenience, a head packet identifier field 221 and a tail packet identifier field 222. Queue delay tracking data 220 may further include various other data used to track and compute one or more types of queue delay, such as a tail enqueue timestamp field 223, a marker packet identifier field 224, and a marker enqueue timestamp field 225. Queue delay tracking data 220 may furthermore include a stored delay field 226 that is frequently updated based on the current time and the marker timestamp field 225. The exact types of data stored within the queue delay tracking data 220 will depend on the manner(s) in which queue delay is calculated. For instance, the number of marker identifier fields 224 and marker enqueue timestamp fields 225 may vary depending on the number of marker packets kept for the queue.

Queue data 200 may further include queue profile data 230. Queue profile data 230 includes an expiration deadline 231 and a delay deadline 232, corresponding to a threshold for an expiration delay-based action and a threshold for a delay-based visibility monitoring action, respectively. Although only two thresholds are depicted, queue profile data 230 may include any number of other thresholds for other delay-based actions, depending on the embodiment. For example, there may be different deadlines to indicate the severity of delay (e.g. high, medium, or low). Queue data 200 may store queue profile data 230 directly, or contain a profile field that references a profile identifier mapped to the specific queue profile data 230 of the current queue.

Queue data 200 may further include queue status data 240, characterizing the current state of the queue. Queue status data 240 may include a variety of state information fields for the queue, such as an expired queue bit 241 indicating whether the queue is expired, a delay monitoring active bit 242 indicating whether delay-based visibility monitoring is active for the queue, a drop monitoring active bit 243 indicating whether drop-based visibility monitoring is active for the queue, and/or a drop visibility identifier field 244 indicating the last packet for which drop-based visibility monitoring and/or queue forensics should be performed.

The illustrated structures in FIG. 2 are merely examples of suitable data structures for describing a queue, and a variety of other representations may equally be suitable depending on the embodiment. Moreover, data structures depicted in FIG. 2 that are used only for certain specific techniques described herein, such as without limitation marker identifier field 224 and drop visibility identifier field 244, are of course not needed in embodiments where those techniques are not employed. Some or all of status data 240 may be calculated from other information on demand, rather than stored, in certain embodiments, as may delay field 226.

2.7. Visibility Component

Returning to FIG. 1, device 100 further comprises a visibility component 160 configured to receive packets 105 that have been tagged with certain tags for visibility purposes, and to perform various visibility actions based on the tags. The visibility component 160 may be dedicated hardware within device 100, logic implemented by a CPU or microprocessor, or combinations thereof.

In an embodiment, the visibility component 160 is an inline component inside device 100 that operates on information provided by the traffic manager to determine next visibility actions such as, without limitation, annotating packets, reconfiguring device parameters, indicating when duplicate packets should be made, or updating statistics, before transmitting the packet to ports. In an embodiment, the visibility component 160 may be a sidecar component (either inside the chip or attached to the chip) that may not have the ability to directly modify packets in-flight, but may collect state and/or generate instructions (such as healing actions) based on observed state. In an embodiment, the visibility component 160 may be designated data collector (such as an endpoint) that automatically produces logs, notifications, and so forth.

Alternatively, the visibility component 160 may reside on an external device, such as a special gateway or network controller device.

Packets 105 that have been tagged in accordance to the described techniques, such as packets 105 that have been dropped due to an expire queue 142, or packets 105 in a queue 142 when a delay-based monitoring or drop event occurs, may be referred to as visibility packets, and the tags themselves may be referred to as visibility tags.

The visibility component 160 may receive such visibility packets 105 in real-time, as they are generated, or the visibility component 160 may be configured to receive such packets 105 from one or more special visibility queues 142 on a delayed and potentially throttled basis. In some embodiments, an existing queue 142 may temporarily be processed by a visibility component 160 as a special visibility queue 142 (e.g. where the queue 142 has a delay greater than a certain threshold, or where an assigned packet 105 has been dropped before entering the queue 142).

Special visibility packets 105 may be used for a number of different purposes, depending on the embodiment. For instance, they may be stored for some period of time in a repository, where they may be viewed and/or analyzed through external processes. A visibility component 160 may automatically produce logs or notifications based on the visibility packets 105. As another example, certain types of special visibility packets may be sent to or consumed by custom hardware and/or software-based logic (deemed a "healing engine") configured to send instructions to one or more nodes within the network to correct problems associated with those types of special visibility packets. For instance, the visibility component 160 may dynamically change configuration settings 115 of device 100 directly in response to observing visibility packets having certain characteristics.

In an embodiment, only a portion of the packet 105 is actually tagged, with the rest of the packet being discarded. For instance, if a switch is operating at a cell or frame level, a certain cell or frame may be detected as the "start of packet" (SOP), and include information such as the packet header. This cell or frame, and optionally a number of additional following cells or frames, may form the special visibility packet, and other cells or frames of the packet (e.g. cells or frames containing the payload and/or less important header information) may be discarded.

In some embodiments, a packet 105 having certain tags and/or undergoing certain types of issues may be duplicated before being forwarded to the visibility component 160, so that the original packet 105 continues to undergo normal processing (e.g. in cases where an issue is observed, but the issue does not preclude normal processing of the packet 105), and the duplicate becomes the special visibility packet.

For example, in an embodiment, upon detecting a visibility tag, a processing component may, in addition to processing the packet 105 normally, create a duplicate packet 105, remove its payload, forward the duplicate packet to the visibility component 160, and remove the tag from the original packet. Or, as another example, the processing component may redirect the original packet 105 to the packet to the visibility component 160 without further processing.

Visibility Tags

A visibility tag may be any suitable data in or associated with a packet, that is recognized as indicating that the packet is a special visibility packet or contains special visibility information (either in the packet or travelling along with the packet to the packet processor). Aside from the existence of the visibility tag marking the packet as a special visibility packet, the visibility tag may include annotated information, including without limitation information indicating the location of the drop or other issue (e.g. a node identifier, a specific processing stage, and/or other relevant information), the type of drop or other issue that occurred, excessive delay information, expiration information, forensics information, and so forth. A packet processor may opt to use or consume tag data, forward tag data to a downstream component, or both.

A visibility tag may, for instance, be communicated as a sideband set of information that travels with the packet to the visibility queue (and/or some other collection agent). Or, a visibility tag may be stored inside the packet (e.g. within a field of the packet header, or by way of replacing the packet payload) and communicated in this way to an external element that consumes the tag. Any packet or portion of the packet (e.g. cell or subset of cells) that has an associated visibility tag is considered to be a visibility packet.

Visibility Queue

In an embodiment, one or more special queues 142, termed visibility queues, may be provided to store packets containing visibility tags. A visibility queue may be represented as a queue, FIFO, stack, or any other suitable memory structure. Visibility packets may be linked to the visibility queue only (i.e. single path), when generated on account of certain terminal events (e.g. dropping). Or, visibility packets may be duplicated to the visibility queue (i.e. copied or mirrored) such that the original packet follows its normal path, as well as traverses the visibility path (e.g. for non-terminal events such as non-critical delay monitoring).

In an embodiment, once tagged as a special visibility packet, a packet 105 is placed in a visibility queue. For example, the tagged packet may be removed from normal processing and transferred to buffer management logic. The buffer management logic then accesses the special visibility packet, observes the visibility tag, and links the packet to a special visibility queue.

Visibility queue data can be provided to various consuming entities within device 110 and/or the network through a variety of mechanisms. For example, a central processing unit within the node may be configured to read the visibility queue. As another example, packet processing logic may be configured to send some or all of the visibility packets directly to a central processing unit within the node as they are received, or in batches on a periodic basis. As yet another example, packet processing logic may similarly be configured to send some or all of the visibility packets to an outgoing interface, such as an Ethernet port, external CPU, sideband interface, and so forth. Visibility packets may be sent to a data collector, which may be one or multiple nodes (e.g. cluster of servers), for data mining. As yet another example, packet processing logic may similarly be configured to transmit some or all of the visibility packets to a healing engine, based on the visibility tag, for on-the-fly correction of specific error types.

According to an embodiment, to avoid overloading device 100 with traffic on account of replicated "visibility" packets or other traffic generated for visibility purposes, a traffic shaper may be utilized to limit the amount of visibility traffic to a certain amount (e.g. a packet rate limit or byte rate limit). If the rate is surpassed, the device 100 may drop packets 105 that are destined for a visibility queue to avoid overloading the device 100. Such a rate may be set globally, and/or rates may be prescribed for individual visibility queues 142 associated with specific tags, groups, flows, or other packet characteristics.

2.8. Miscellaneous

Device 100 illustrates only one of many possible arrangements of components configured to provide the functionality described herein. Other arrangements may include fewer, additional, or different components, and the division of work between the components may vary depending on the arrangement. For example, in some embodiments, deadline profiles 145 and/or visibility component 160 may be omitted, along with any other components relied upon exclusively by the omitted component(s).

As another example, in an embodiment, a device 100 may include any number of buffer managers 120, each coupled to a different set of packet processors 150. As a packet 105 is processed by one packet processor 150, assuming the packet 105 is not sent out of the device 100, the packet 105 may be forwarded to the buffer manager 120 for the next packet processor 150 to handle the packet 105. For example, there may be an ingress buffer manager 120 for newly received packets 105, a buffer manager 120 for traffic flow control, a buffer manager 120 for traffic shaping, and a buffer manager 120 for departing packets. The buffer managers 120 may share buffers 130, such that the packets 105 are passed by memory reference and need not necessarily change locations in memory at each stage of processing. Or, each buffer manager 120 may utilize a different set of buffers 130. In such embodiments, there may be a single queue manager 140 for all queues 142, regardless of the associated buffer manager 120, or there may be different queue managers 140 for different buffer managers 120 (e.g. for an ingress buffer manager, egress buffer manager, etc.).

3.0. Functional Overview 3.1. Packet Handling

Figure 3:
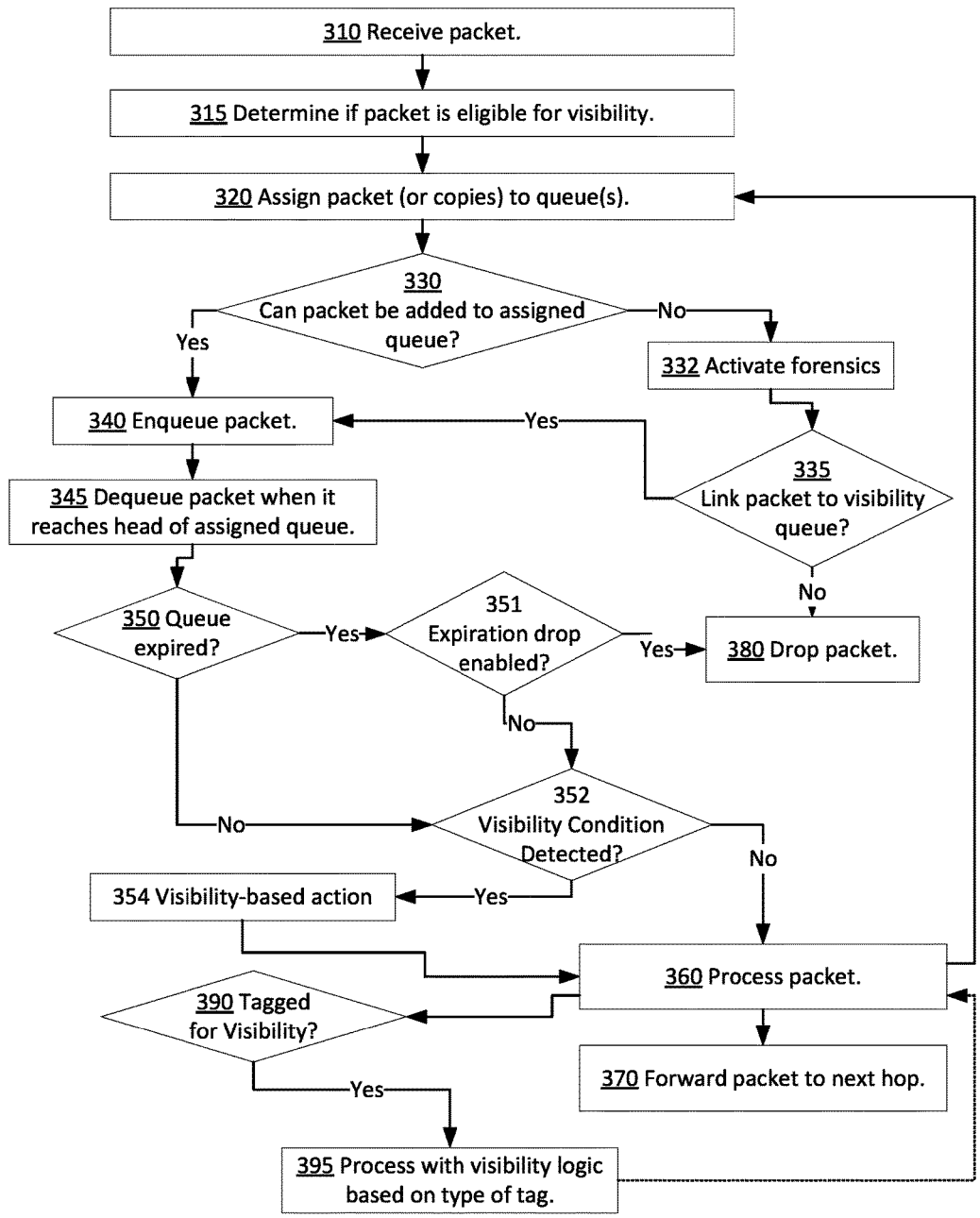
FIG. 3 illustrates an example flow for handling packets using queues within a network device.

FIG. 3 illustrates an example flow 300 for handling packets using queues within a network device, according to an embodiment. The various elements of flow 300 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 310 comprises receiving a packet, such as a packet 105. The packet may be received from another device on a network. For example, the packet may be a packet addressed from a source device to a destination device, and the device receiving the packet may be yet another device through which the packet is being forwarded along a path. As another example, if the packet is generated by the network device itself, the packet may be received from an internal component that generated the packet. The packet, when received, may be processed by a packet processor, such as a packet processor 150, for various reasons described elsewhere.

Block 315 comprises determining that a packet is eligible for visibility processing. For various reasons, in some embodiments, certain types of packets are deemed visibility ineligible. For example, the user may only want to have visibility on certain high priority flows. As another example, the incoming packet may be a visibility packet from an upstream device that the receiving device may thus elect not to perform additional visibility processing on. If the packet is ineligible for visibility processing, the packet is enqueued (if resources permit) and dequeued normally, without special consideration for visibility processing.

Block 320 comprises assigning the packet (or one or more copies thereof) to a queue, such as a queue 142. Block 320 may comprise, for instance, the buffer manager sending the packet, or information indicating a location in memory where the packet has been stored, to queue management logic, along with an indication of a queue that has been selected for the processing of the packet (e.g. as provided by upstream logic, such as packet processor 150A). Selection of the queue to which the packet should be assigned may involve consideration of a variety of factors, including, without limitation, source or destination information for the packet, a type or class of the packet, a QoS level, a flow to which the packet is assigned, labels or tags within the packet, instructions from a processing component that has already processed the packet, and so forth.

Block 330 comprises determining whether the packet may be added ("enqueued") to the assigned queue. There may be any number of reasons why the device may not be able to add the packet to the assigned queue. For instance, the queue may be expired. Or, the size of the queue may be too large to add additional packets. Or, there may be too few buffers available for the queue because other queues have consumed all of the available buffers. Or, adding the packet may cause the queue to surpass a rate limit for processing queues over a recent period time. Size and rate restrictions may be global, queue-specific, or even specific to a particular property of the packet. Yet other reasons for not being able to add the packet to the assigned queue may also exist, depending on the embodiment.

If, in block 330, the packet cannot be added to its assigned queue, the flow proceeds to block 332. In block 332, optionally, forensics may be activated for the queue to which the packet was assigned. For example, if the packet is assigned to Port 0, Queue 3, but is dropped due to the queue length being greater than the queue size limit, Queue 3 (or all queues for Port 0) may be placed in a forensics state where the contents of the queue(s) are provided a drop forensics tag upon departure from the queue(s).

Meanwhile, in block 335, it is determined whether the packet can and should be linked to a visibility queue for processing by a visibility component. In an embodiment, only packets having certain characteristics (e.g. ports, flows, groups, protocol types, sources, assigned queues, etc.) are added to a visibility queue. There may be different queues for some or all of the characteristics. In an embodiment, packets are further or instead selected for linking to a visibility queue based on probabilistic sampling (e.g. every third packet that has a certain characteristic, one packet every other clock cycle, etc.) or rate-aware sampling (e.g. a set of ten consecutive packets every one thousand packets). Or, in an embodiment, there may be a single queue to which all packets are automatically added. In any case, block 335 may further comprise determining whether there is actually room for the packet in the special visibility queue, or whether a visibility rate limit will be surpassed.

If, in blocks 330/335, it is determined that the packet cannot be added to its assigned queue or a visibility queue, flow 300 proceeds to block 380, where the packet is dropped, meaning that it is either removed or diverted from normal processing.

On the other hand, if, in blocks 330 or 335, it is determined that the packet can be added to a queue, flow 300 proceeds to block 340. At block 340, the packet is enqueued. The packet is typically added at the tail of the queue. Queue management logic will, over time, shift the packet closer and closer to the head of the queue, until in block 345, the packet reaches the head of the queue and is dequeued. In an embodiment, packets within the queue are processed in a first-in-first-out (FIFO) order. Optionally, for delay tracking purposes, a marker identifier and timestamp for the assigned queue may be created and/or updated at this time.

Block 350 comprises determining whether the queue is expired, as may occur from time to time in certain embodiments if a queue expiration delay-based action is enabled. This determination may be made in a number of manners, such as detecting an expiration tag in the dequeued packet, receiving a signal from queue management logic, reading a status of the queue, comparing a queue delay to an expiration delay threshold, and so forth. If the queue is expired, and if expiration dropping determined to be enabled per block 351, flow proceeds to block 380. Otherwise flow proceeds to block 352.

Block 352 comprises determining whether a visibility condition is detected. For instance, a visibility condition may be detected if the queue is expired (per block 350) or if the queue is in a state of excessive delay. This determination may be made in similar manner as to above, but with respect to one or more thresholds or states associated with one or more levels of excessive delay. If the queue is in such a state, then at block 354, a visibility-based action is performed, such as tagging the packet with a tag associated with the level of delay, annotating the tag with queue metrics or system metrics, and so forth. Otherwise, flow proceeds to block 360. Note that the exact order of blocks 350 and 354 may vary, depending on the embodiment. Blocks 350 and 354 may, for example, be a combined step that determines a delay level based on multiple ranges or thresholds, with the dropping of the packet being but one example of a possible action to perform when the delay is above a specific one of the levels.

Block 360 comprises processing the dequeued packet. The packet may be processed, for instance, by any suitable processing component that is associated with the queue to which the packet was assigned. The processing may involve, for instance, determining where to send the packet next, manipulating the packet, dropping the packet, adding information to the packet, or any other suitable processing steps. As a result of the processing, the packet will typically be assigned to yet another queue for further processing, thereby returning to block 320, or forwarded out of the device to a next destination in block 370.

In certain embodiments, block 360 may comprise a block 390. Block 390 comprises determining whether the packet is tagged for visibility purposes. For instance, depending on the configuration of the device, the packet may have been tagged in response to a delay-based visibility monitoring event, drop visibility event, or expiration event. If no tag exists, no additional action is implicated. On the other hand, if a tag exists, a block 395 may be performed with respect to the packet.

Block 395 comprises processing the packet with visibility logic, such as described with respect to visibility component 160, based on the type of tag that is associated with the packet. The processing may lead to a variety of actions, such as generating a log or notification, reconfiguring one or more settings of the device (or another device), forwarding the packet to a downstream component such as a server or data collector to perform such functions, and so forth. In cases where the packet has been dequeued from a special visibility queue, note that block 395 and block 360 are in fact the same processing, with the packet processor of block 360 being, in essence, the special visibility component.

Note that, if the packet was not dropped, block 395 may be performed concurrently or at any other time relative to the continuing processing of the packet in flow 300. In an embodiment, to avoid the packet departing the device or being subject to further manipulation before block 395 can be performed, block 395 may be performed on a copy of the packet while the original packet proceeds through flow 300 in the manner previously stated. In another embodiment, the packet may be returned to the processing of block 360 after block 395.

Flow 300 illustrates only one of many possible flows for handling a packet using queues. Other flows may include fewer, additional, or different elements, in varying arrangements. For example, in some embodiments, blocks 330, 350, 352, 354, 390, and/or 395 may be omitted. Note that flow 300 may be repeated by a device any number of times with respect to any number of packets. Some of these packets may be processed concurrently with each other. Different packets may be assigned to different queues, depending on the characteristics of the packets and the purposes of the queues. Moreover, a single packet may be assigned to different queues at different times, as the flow loops through blocks 320-360.

3.2. Enqueue Process

Figure 4:
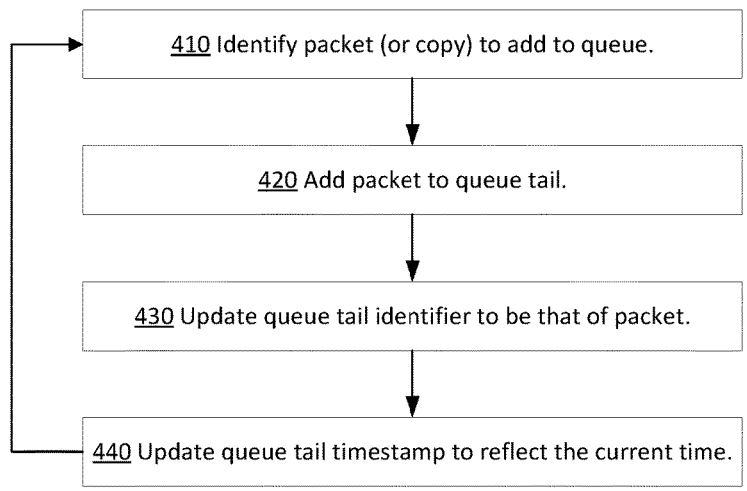
FIG. 4 illustrates an example flow for enqueuing packets.

FIG. 4 illustrates an example flow 400 for enqueuing packets, according to an embodiment. Flow 400 may be performed, for instance, by queue management logic, such as queue management logic 140, as part of block 340 in FIG. 3, or to enqueue a packet for any other process flow. The various elements of flow 400 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 410 comprises identifying a packet, such as a packet 142, or a copy of a packet, to add to a queue, such as a queue 142, or to multiple queues (e.g. by mirroring, copying, etc.). The packet may be identified using a memory location in which the packet is stored, a sequence number, or via any other identifier.

Block 420 comprises adding the packet to the tail of the queue. Depending on the structure used to represent the queue, this may comprise steps such as adding the packet or packet identifier as a node in a linked list, manipulating an ordered array of packets or packet identifiers, or other suitable queue management techniques. While a FIFO queue is described herein, note that in other embodiments, similar techniques may be extended to other types of queues, such as push-in-first-out (PIFO).

Block 430 comprises updating a queue tail identifier to be that of the packet. This step may be optional where the identifier is readily discernable from the structure used to represent the queue.

Block 440 comprises updating queue delay tracking data, such as queue delay tracking data 220, to record an enqueue timestamp of the packet. In an embodiment, an enqueue timestamp may be recorded for each packet in the queue. In another embodiment, only certain enqueue timestamps are kept, including an enqueue timestamp for the packet within the queue that is currently at the tail of the queue, and/or for the last designated marker packet. In an embodiment, the timestamp recorded in block 440 may overwrite a timestamp stored for the tail of the queue or the last designated marker packet.

Flow 400 illustrates only one of many possible flows for enqueuing a packet. Other flows may include fewer, additional, or different elements, in varying arrangements. For example, in some embodiments, block 430 may be omitted. As another example, in an embodiment, block 440 may only be performed for certain packets or at certain times. Flow 400 may be repeated for any number of packets, and be performed concurrently for any number of queues.

3.3. Dequeue Process

Figure 5:
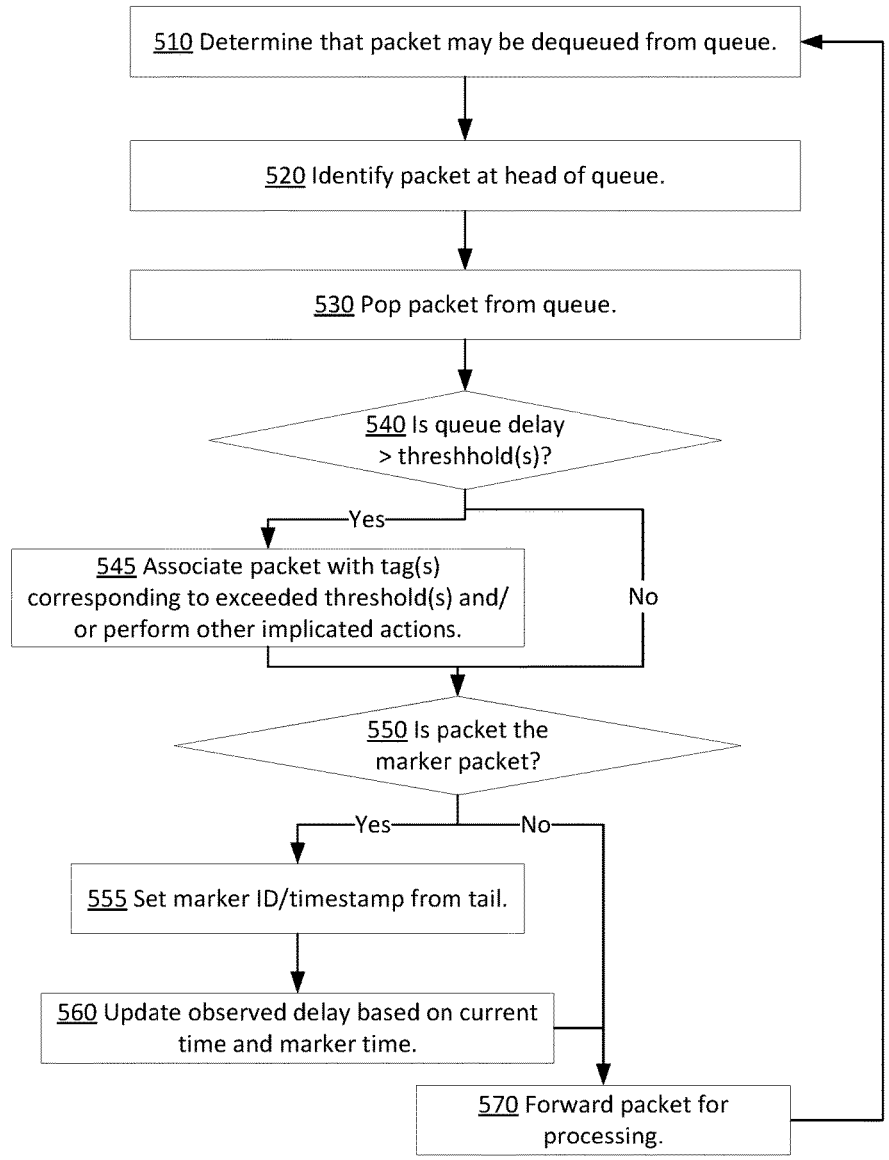
FIG. 5 illustrates an example flow for dequeuing a packet.

FIG. 5 illustrates an example flow 500 for dequeuing a packet, according to an embodiment. Flow 500 may be used, for example, to dequeue packets that were enqueued using flow 400. Flow 500 may be performed concurrently with respect to flow 400 for the same queue. That is, while one process is enqueuing packets at the tail of the queue, another process may simultaneously dequeue packets at the head of the queue. Flow 500 may be utilized in performance of block 345, or to dequeue packets in any other process flow. Flow 500 may be performed for many different queues concurrently.

The various elements of flow 500 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 510 comprises determining that a packet, such as a packet 105, may be dequeued from a queue, such as a queue 142. The determination to dequeue a packet may occur based on a variety of factors, depending on the embodiment. For example, a determination of whether a packet, or a portion of a packet, may be dequeued from a queue may be made every clock cycle. A packet may be dequeued in that clock cycle if, for example, a processing component coupled to the queue has signaled that it is ready for another packet. As yet another example, a resource manager may determine that a certain number of packets may be released from a queue at a certain time based on available processing components or other resources. Queues may be prioritized based on various factors such that some queues are authorized to release packets, or portions of packets (e.g. segments or cells) in a given clock cycle, while others are not. In some embodiments, more than one packet may be released each clock cycle, while in other embodiments, a packet may be released only every other clock cycle or at longer intervals.

The techniques described herein are not specific to any particular logic for determining when to dequeue a packet from the queue, except to the extent that use of the logic introduces queue delay at least on some occasions (e.g. on at least some occasions, more packets may be enqueued into a queue over a certain period of time than can be dequeued over that period of time).

Block 520 comprises identifying a packet at the head of the queue. Block 530 comprises popping the packet from the queue. For instance, the queue manager may issue a read request to the buffer manager for buffers associated with the packet. The exact manner in which blocks 520 and 530 are performed depends on the data structure(s) used to represent the queue. As an example, if a linked list of packets or packet identifiers is used, the node at the head of the linked list may be identified and unlinked from the rest of the list. Of course, any other suitable queue management techniques may be utilized.

Block 540 comprises determining whether the queue delay is greater than a threshold for a certain delay-based action. Block 540 may comprise, for example, calculating the queue delay based on the enqueue timestamp of a marker packet within the queue, independent of any dequeue process. Or, block 540 may comprise reading the results of such a calculation, which may have already been stored as a result of previous iterations of block 570 or on account of a background process for computing queue delay.

Depending on which delay-based actions are supported by the embodiment, and/or which delay-based actions are enabled for the queue, the queue delay may be compared to one or more different thresholds. For example, the queue delay may be compared to an expiration threshold and/or one or more different delay-based visibility threshold (e.g. for high delay, medium delay, and low delay). The thresholds themselves may be hard-coded into the queue management logic, or read from a configurable global or queue-specific profile.

If, in block 540, it is determined that the queue delay is greater than an applicable threshold, flow 500 proceeds to block 545. At block 545, for each threshold exceeded, a delay-based action associated with that threshold is performed. For example, the packet may be annotated with a tag associated with the threshold and/or other information. An expired queue tag may be used for an expiration threshold, for instance, while a delay visibility tag may be used for a delay visibility threshold. As another example, the packet may be tagged with a value indicating the queue delay or a queue delay level.

As yet another example, the status of the queue itself may be updated to indicate that the queue is in a special state corresponding to an exceeded threshold. For example, if an expiration threshold has been surpassed, the entire queue may be marked as expired. The special state of the queue may have various implications, such as accelerating the dequeuing of the queue, activating a background process that reads the packet links and frees up the associated buffers to accelerate a draining process, blocking additional enqueues to the queue, disabling traffic flow control or shaping, and so forth. In other embodiments, activation of a special queue state may instead occur at other times, such as during performance of a background threshold monitoring task. Rather than performing an actual comparison in block 540, block 540 may simply comprise looking up the state of the queue with respect to the applicable threshold.

If, in block 540, it is determined that the queue delay is not greater than any applicable threshold, flow 500 may skip block 545 and proceed to block 550. However, in some embodiments, a determination that the queue delay is not greater than a particular threshold may result in performance of certain steps in certain contexts, such as changing the status of the queue to indicate that the queue is no longer in a special state associated with the applicable threshold. In yet other embodiments, inactivation of a delay-based state instead occurs in response to other events, such as the emptying of the queue, dequeuing of a marker packet, performance of a background threshold monitoring task, and so forth.

Block 550 comprises determining whether the packet is designated as a marker packet. For example, block 550 may comprise comparing a marker identifier stored in queue delay tracking data to an identifier of the packet being dequeued. If the packet is designated as the marker packet, then flow 500 proceeds to block 555. Otherwise, flow 500 skips block 555 and proceeds to block 570. Blocks 555/560 may also be performed in parallel with block 570, in certain embodiments.

Block 555 comprises performing various steps to designate a new marker packet. These steps may include, for instance, setting a marker identifier and marker timestamp within queue delay tracking data to be the tail packet identifier and the tail enqueue timestamp, as described in other sections.

Block 560 comprises updating a stored observed queue delay time based on the current time and the marker timestamp. If the queue delay is not stored (i.e. computed every time it is needed), or if the queue delay is updated via a background process, block 560 may be optional.

Block 570 comprises forwarding the packet to a processing component associated with the queue for processing. The packet may be forwarded by sending a reference to an identifier or memory location of the packet, or by sending the packet itself, depending on the embodiment. The processing component may be any suitable processing component, as described in other sections. Flow 500 may then be repeated for other packets in the queue.

Flow 500 illustrates only one of many possible flows for dequeuing. Other flows may include fewer, additional, or different elements, in varying arrangements. For example, in some embodiments, blocks 540-545 may be performed before block 530, after blocks 550-555, and/or at different times or different thresholds. Similarly, blocks 550-555 may be performed any time after block 510, including after block 560. Many other variations are likewise possible.

3.4. Drop Visibility and Queue Forensics

Figure 6:
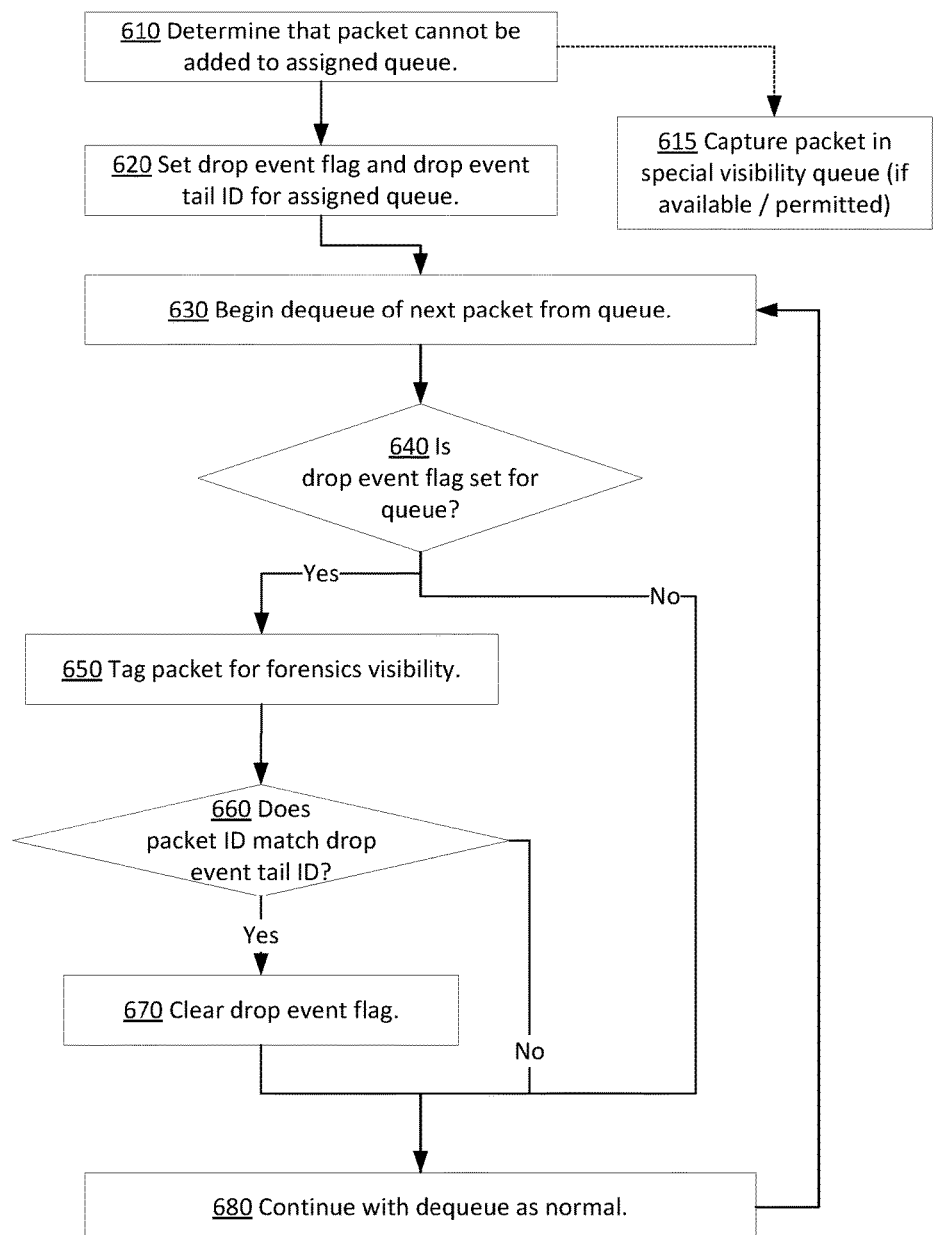
FIG. 6 illustrates an example flow for providing visibility into drops occurring prior to enqueuing packets into their assigned queues.

FIG. 6 illustrates an example flow 600 for providing visibility into drops occurring prior to enqueuing packets into their assigned queues, according to an embodiment. In some embodiments, flow 600 may be performed in conjunction with flows 300, 400, and 500, while other embodiments may involve performing only some of or even just one of flows 300, 400, 500, or 600.

The various elements of flow 600 may be performed in a variety of systems, including systems such as system 100 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 610 comprises determining that a packet cannot be added to a queue to which it has been assigned. For example, if flow 600 is being used in conjunction with flow 300, block 610 may correspond to a negative determination in block 330. As explained in other sections, a device may determine that a packet cannot be added to the queue to which the packet has been assigned for any of a variety of reasons.

From block 610, two different actions may be triggered. First, in block 615, the packet may be captured via a special visibility queue, if available and permitted, as described in other sections. In an embodiment, the packet may also be provided a special drop visibility tag.

Concurrently, flow 600 may proceed to block 620. Block 620 comprises recording information describing a drop event with respect to the queue. For example, a drop counter associated with the queue may be updated. Additionally, or instead, a drop event flag may be set, or a drop visibility monitoring status may be activated for the queue. A packet identifier for the tail packet within the queue may, in some embodiments, also be recorded within a data structure intended to store a drop event tail identifier.

Block 630 comprises beginning dequeuing of a next packet from the queue. The dequeuing may involve a variety of steps, such as determining that is time to dequeue another packet from the queue, identifying the head packet, unlinking the head packet from the queue, and so forth. For example, in an embodiment, a process comprising some or all of the steps described with respect to flow 500 is performed.

Block 640 comprises, as part of the dequeuing process, determining whether queue forensics are active for the queue, using a flag or status indicator set in block 620. If queue forensics monitoring is inactive, then flow proceeds to block 680, in which the dequeue process continues as normal, by forwarding the packet to an associated processing component. Otherwise, flow proceeds to block 650.

Block 650 comprises tagging the packet with a special tag for forensics visibility. This tag may also be referred to as a forensics visibility tag. The tag, when detected by a processing component, may cause the processing component to duplicate at least a portion of the packet and send the duplicated packet or portion thereof to a visibility component, as described in other sections. The packet may furthermore be annotated with a variety of other information related to the queue and/or the drop event, such as a drop event identifier, queue identifier, queue delay, and so forth.

Block 660 comprises determining whether the packet identifier of the packet being dequeued matches the drop event tail identifier. If not, flow proceeds to block 680. Otherwise, flow proceeds to block 670.

Block 670 comprises deactivating queue forensics monitoring by, for instance, unsetting a drop event flag for the queue or changing the status of the queue.

Flow 600 may loop from block 680 back to block 630 for any number of packets in the queue. Note that additional downstream actions may be performed with respect to any packets tagged via flow 600, as described in other sections.

Flow 600 illustrates only one of many possible flows for drop visibility monitoring and queue forensics. Other flows may include fewer, additional, or different elements, in varying arrangements. For example, in some embodiments, tagging may occur prior to the tag being dequeued. That is, all packets in the queue may automatically be tagged in response to block 610 rather than at dequeue time, thus avoiding the need for most of flow 600. Or, instead of a separate drop event flag or status indicator, the mere existence of a valid packet identifier stored in the drop event tail identifier field of the queue may indicate that queue forensics monitoring is active. Block 670 may thus instead constitute removing the packet identifier from the field.

4.0. Implementation Examples

4.1. Example Delay Tracking Use Case

Figure 7:
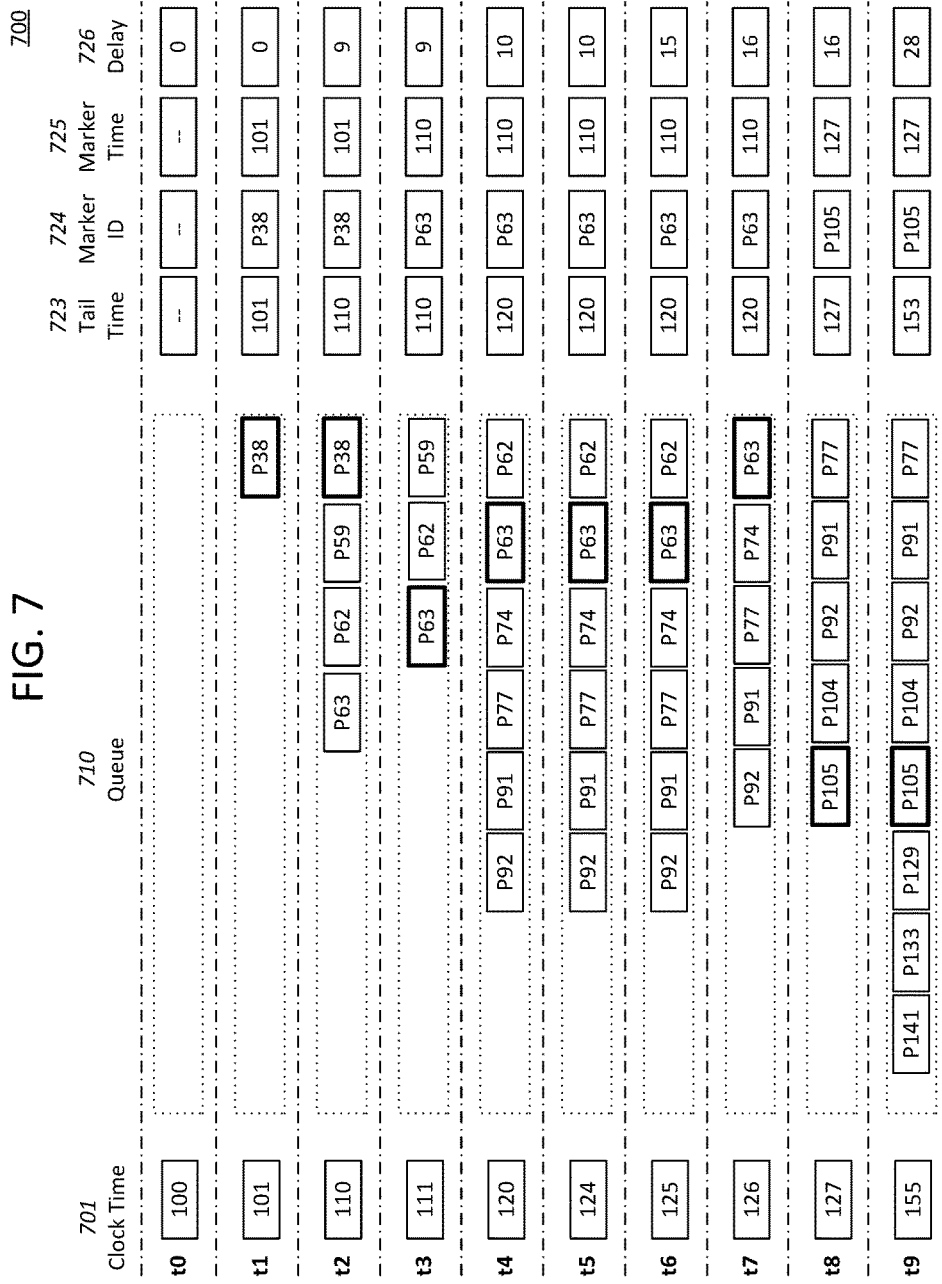
FIG. 7 illustrates example queue data for an example queue changing over time in response to example events.

FIG. 7 illustrates example queue data 700 for an example queue 710 changing over time in response to example events, according to an embodiment. The examples are given by way of illustrating techniques utilized in some of the many embodiments described herein. However, it will be apparent that the illustrated queue data 700 is merely one example of how queue data may be structured, and the example changes to the queue data 700 illustrate but one example technique for managing a queue. The actual structure of the queue data and the specific techniques utilized to manage that queue data will vary from embodiment to embodiment.

Queue data 700 comprises queue arrangement data describing the sequence of packets that form queue 710, a tail packet enqueue timestamp 723, a marker packet identifier 724, a marker packet enqueue timestamp 725, and a queue delay 726. Queue data 700 is illustrated at ten different instances in time, labeled t0 through t9, with each instance corresponding to a progressively increasing associated clock time 701.

At t0, there are no packets in queue 710. There is therefore no tail packet enqueue timestamp 723, marker packet identifier 724, or marker packet enqueue timestamp 725. The queue delay 726 is set to a nominal value of 0.

At t1, a single packet P38 is enqueued. During the enqueue of P38, the tail time 723 is set to 101, which is the current clock time 701. Since the marker packet identifier 724 was empty, the marker packet identifier 724 is set to the identifier of the enqueued packet P38, and the marker time 725 is set to that of the tail time 723. The marker packet at a given instance of time is hereafter denoted in FIG. 7 using a bold border.

By t2, three more packets have been enqueued, including, most recently, a packet P63, which has been enqueued in the current clock cycle. During the enqueue of packet P63, the tail time 723 is set to 110, which is the current clock time 701. On account of a background process configured to update the queue delay 726 every five clock cycles, queue delay 726 is updated to 9, which is the difference between the clock time 701 and the marker time 725.

At t3, packet P38 is dequeued. Since marker identifier 724 indicates that packet P38 is the marker packet, the packet at the tail of queue 710, packet P63, is designated as the new marker packet, and the marker identifier 724 is updated to reflect the packet identifier of the tail packet. The tail time 723 is copied to the marker time 725. Although the difference between the clock time 701 and the new marker time 725 is now 1, queue delay 726 is updated to 9 in response to the dequeuing of packet P38, since the queue delay of the most recently departed packet P38 is now larger than the difference between the clock time 701 and the marker time 725.

By t4, a packet P59 has been dequeued. Four more packets have been enqueued, including, most recently, a packet P92, which has been enqueued in the current clock cycle. During the enqueue of packet P92, the tail time 723 is set to 120, which is the current clock time 701. On account of a background process configured to update the queue delay 726 every five clock cycles, queue delay 726 is updated to 10, which is the difference between the clock time 701 and the marker time 725, and is now greater than the queue delay of the most recently departed packet P38.

By t5, four more clock cycles have elapsed without an enqueue or dequeue. Therefore, none of tail packet enqueue timestamp 723, marker packet identifier 724, or marker packet enqueue timestamp 725 are changed. Moreover, since no dequeue has occurred, and since the background process is configured to update the queue delay 726 only every five clock cycles, queue delay 726 remains set to 10.

At t6, another clock cycle has elapsed without an enqueue or dequeue. Since the current clock cycle is a fifth clock cycle, the background process updates queue delay 726 to 15, which is the difference between the clock time 701 and the marker time 725.

At t7, a packet P62 is dequeued. During the dequeue, queue delay 726 is updated to 16, which is the difference between the clock time 701 and the marker time 725.

At t8, packet P63 is dequeued and a packet P105 is enqueued. During the enqueue of packet P105, the tail time 723 is set to 127, which is the current clock time 701. Since marker identifier 724 indicates that packet P63 is the marker packet, the packet at the tail of queue 710, packet P105, is designated as the new marker packet, and the marker identifier 724 is updated to reflect the packet identifier of the tail packet. The tail time 723 is copied to the marker time 725. In response to dequeuing of packet P63, queue delay 726 remains at the queue delay of the most recently dequeue marker packet P63, in spite of the fact that the difference between the clock time 701 and the new marker time 725 is now 0. The queue delay can fall no lower than this value unless the next marker packet P105 is dequeued before 16 clock cycles elapse, since the queue delay is always the greater of the delay of the most recently dequeued marker packet and the difference between the clock time 701 and the new marker time 725.

By t9, three more packets have been enqueued, including, most recently, a packet P141, which was enqueued in a previous clock cycle having a clock time of 153. During the enqueue of packet P141, the tail time 723 was set to 153, being the clock time at the time of enqueue. Since the current clock cycle is a fifth clock cycle, the background process updates queue delay 726 to 28, which is the difference between the clock time 701 and the marker time 725.

To simplify explanation of the described techniques, FIG. 7 assumes that each packet arrive and are transmitted in a single clock cycle. However, in other embodiments, some or all of the packets may arrive and/or be transmitted over more than one clock cycle. For instance, a 64 Byte packet may arrive on a 100 G port at ((64+20)*8)/100*1e9)=6.72 ns whereas a 128 Byte packet will take twice as long. Application of the techniques described herein are readily extended to such embodiments. For example, the times recorded by the queue may be times when the packets begin to arrive or depart, or times when the packets have fully arrived or departed. Or, the packets may be broken into portions of packets, and processed individually.

4.2. Alternative Delay Tracking Techniques

According to an embodiment, a variety of alternative queue delay tracking techniques, other than that depicted in FIG. 7, may also or instead be utilized. As one potentially very costly alternative, a device may track the packet delay of each packet in the queue.

As another alternative, the timestamp of the tail packet need not be constantly tracked. Various mechanisms may then be utilized to designate a new marker packet once the marker packet is dequeued. For example, the tail packet may become the marker packet as previously described, but a current system time may be utilized as the marker timestamp rather than the actual enqueue time of the tail packet (since it was not recorded). This approach may provide an acceptable approximation of queue delay in many cases. As another example, the marker packet identifier may be set to some value to indicate that there is no current marker packet. When no marker packet exists, various assumptions regarding the queue delay may be made, depending on the embodiment. For example, the last known queue delay may be utilized, or the queue delay may be assumed to be some function of the last known queue delay, a default value, or even zero. When a new packet is enqueued while no marker packet exists, the new packet becomes the marker packet, its enqueue timestamp is recorded as the marker timestamp, and queue delay may once again be calculated based on the marker timestamp (and/or comparing the queue delay of the most recently dequeued marker packet with that calculated from the new marker timestamp).

As yet another alternative, a device may track packet delays for multiple marker packets in the queue. New marker packets may be selected at specific time intervals, specific packet intervals, in response to previous marker packets leaving the queue, and/or any combination thereof. To reduce resource utilization, the number of market packets that may be selected may be limited to a fixed amount.

For example, in some embodiments, a sequence of marker packets may be maintained. The sequence may comprise any number of marker packets, depending on the embodiment. An increase in the number of packets used will generally increase the accuracy of the measure of delay at any given time. Whenever the first (oldest) marker packet in the sequence departs the queue, it is removed from the sequence, and each remaining marker packet is shifted up a position within the sequence. A new marker packet (e.g. the tail packet, or the next packet to be enqueued) may then be added to the sequence. In embodiments with flexible numbers of marker packets, new marker packets may also or instead be added in response to other events, such as the lapsing of certain amounts of time, or upon n enqueues. In an embodiment, the last (newest) designated marker packet in the sequence may periodically be updated to be a different packet in the queue. For instance, the last marker packet may constantly be updated such that the tail packet in the queue is always the last designated marker packet. (In this aspect, the example of FIG. 7 may be considered a special case of this embodiment, utilizing a sequence of only two marker packets, with the tail packet being the second marker packet). On the other hand, rather than always reflecting the tail of the queue, the last designated marker packet in the sequence of marker packets may only be updated upon the next enqueue following the lapsing of a certain time interval, upon every n enqueues, or in response to other events.

In any case, depending on the embodiment, the device may compute the queue delay using the packet delay of the oldest packet for which packet delay is known, the packet delay of the newest packet for which packet delay is known, the packet delay of the most recently dequeued marker packet, and/or functions of the packet delays some or all of the packets in the queue.

4.3. Healing Engine

Certain error types may be correctable by taking action if certain criteria are satisfied. Hence, a healing engine within or outside of a node may be configured to access the visibility packets in the visibility queue. For instance, the healing engine may periodically read the visibility queue directly. Or, as another example, a node's forwarding logic may be configured to send the visibility packets (or at least those with certain types of visibility tags) to an external node configured to operate as a healing engine.

A healing engine may inspect the visibility tags and/or the contents of those visibility packets it accesses. The healing engine may further optionally inspect associated data and input from the other parts of the node which tagged the packet (e.g. port up-down status). Based on rules applied to the visibility packet, or to a group of packets received over time, the healing engine is configured to perform a healing action.

For example, a queue expiration or delay for a packet may have triggered a corresponding visibility tag to be set for the packet, indicating that the queue expiration or delay occurred. The healing engine observes the visibility tag, either in the visibility queue or upon receipt from packet processing logic. The healing engine inspects the packet and determines that the queue expiration or delay may be fixed using a prescribed corrective action, such as adding an entry to the forwarding table or implementing a traffic shaping policy. The healing engine then automatically performs this action, or instructs the node to perform this action.

The corrective set of actions for a tag are based on rules designated as being associated with the tag by either a user or the device itself. In at least one embodiment, the rules may be specified using instructions to a programmable visibility engine. However, other suitable mechanisms for specifying such rules may instead be used.

4.4. Annotations

According to an embodiment, when tagging a packet, a device may further annotate the packet with state information for a queue and/or device. State information may take a variety of forms and be generated in a variety of manners depending on the embodiment. For example, network metrics generated by any of a variety of frameworks at the node may be used as state information. An example of such a framework is the In-band Network Telemetry ("INT") framework described in C. Kim, P. Bhide, E. Doe, H. Holbrook, A. Ghanwani, D. Daly, M. Hira, and B. Davie, "Inband Network Telemetry (INT)," pp. 1-28, September 2015, the entire contents of which are incorporated by reference as if set forth in their entirety herein.

The annotated state information may be placed within one or more annotation fields within the header or the payload. When the annotated packet is a regular packet, it may be preferable to annotate the header, so as not to pollute the payload. If annotated state information is already found within the packet, the state information from the currently annotating node may be concatenated to or summed with the existing state information, depending on the embodiment. In the former case, for instance, each annotating node may provide one or more current metrics, such as a congestion metric. In the latter case, for instance, each node may add the value of its congestion metric to that already in the packet, thus producing a total congestion metric for the path.

The path that the packet is traversing itself may be identified within the packet. In an embodiment, the packet includes a path ID assigned by the source node, which may be any unique value that the source node maps to the path. In an embodiment, the path may be specified using a load balancing key, which is a value that is used by load balancing functions at each hop in the network. In an embodiment, the estimated queue delay or port delay may be used to perform the load balancing decisions. For example, the next hop/destination for a packet may be selected based on, among other factors, which queue (and consequently next hop/destination) has the lowest queue delay or port delay.

In an embodiment, a device may create special annotated packets where the packet is constructed for the purpose of providing information, or debugging or benchmarking performance. Such special annotated packets pass through the devices buffers and queues as would any other packet received by the device, and be consumed by an internal or external component configured to utilize the information carried by the annotated packet.

5.0. Example Embodiments

Examples of some embodiments are represented, without limitation, in the following clauses:

According to an embodiment, a method comprises: assigning packets received by a network device to packet queues; based on the packet queues, determining when to process specific packets of the packets received by the network device, the packets dequeued from the packet queues when processed; tracking a delay associated with a particular packet queue of the packet queues, the delay based on a duration of time for which a designated marker packet has been in the particular packet queue, another packet being designated as the marker packet whenever the currently designated marker packet departs from the queue; when the delay exceeds an expiration threshold, marking the particular packet queue as expired; while the particular packet queue is marked as expired, dropping one or more packets assigned to the particular packet queue, including the designated packet.

According to an embodiment, an apparatus comprises: one or more network interfaces configured to receive packets over one or more networks; a packet processor configured to assigning the packets to packet queues; traffic management logic configured to: based on the packet queues, determining when to process specific packets of the received packets, the packets dequeued from the packet queues when processed; track a delay associated with a particular packet queue of the packet queues, the delay based on a duration of time for which a currently designated marker packet has been in the particular packet queue, another packet being designated as the marker packet whenever the currently designated marker packet departs form the queue; and when the delay exceeds a monitoring threshold, performing one or more delay-based actions with respect to the particular packet.

According to an embodiment, an apparatus comprises: one or more network interfaces configured to receive packets over one or more networks; a packet processor configured to assigning the packets to packet queues; a traffic manager configured to: based on the packet queues, determining when to process specific packets of the received packets, the packets dequeued from the packet queues when processed; track a delay associated with a particular packet queue of the packet queues, the delay based on a duration of time for which a currently designated marker packet has been in the particular packet queue, another packet being designated as the marker packet whenever the currently designated marker packet departs form the queue; and when the delay exceeds a monitoring threshold, associating one or more packets departing from the particular packet queue with a tag indicating that the monitoring threshold has been surpassed; a visibility component configured to, based on the tag and the one or more packets, perform one or more of:

changing one or more settings of the apparatus, storing copies of the one or more packets in a log or data buffer, updating packet statistics, or sending copies the one or more packets to an external device for analysis.

According to an embodiment, a method comprises: assigning packets received by a network device to packet queues; based on the packet queues, determining when to process specific packets of the packets received by the network device, the packets dequeued from the packet queues when processed; tracking a delay associated with a particular packet queue of the packet queues, the delay based on a duration of time for which a currently designated marker packet has been in the particular packet queue, another packet being designated as the marker packet whenever the currently designated marker packet departs form the queue; when the delay exceeds a monitoring threshold, annotating one or more packets departing from the particular packet queue with a tag indicating that the monitoring threshold has been surpassed; sending copies of the one or more packets that were annotated with the tag to a first component configured to, based on the tag and the one or more packets, perform one or more of: changing one or more settings of the network device, updating packet statistics for the network device, or storing copies of the one or more packets in a log or data buffer.

In an embodiment, the apparatus or network device is a network switch. In an embodiment, the packets are one of: cells, frames, IP packets, or TCP segments.

In an embodiment, the particular packet is not designated as the marker packet.

In an embodiment, the visibility component is configured to update packet statistics, the packet statistics including one or more of: a number of packets from a given source, a number of packets to a given destination, a number of packets having a particular priority, a number of packets having a particular forwarding tag, or a number of packets with a particular packet attribute.

In an embodiment, changing one or more settings comprises overriding one or both of: a flow control feature or a traffic shaper feature for the particular packet queue.

In an embodiment, the traffic manager is further configured to, or the method further comprises, comparing the delay to a deadline profile associated with the particular packet queue, the deadline profile indicating multiple different deadlines, including the monitoring threshold, each associated with a different delay-based action.

In an embodiment, the traffic manager is configured to, or the method comprises, tracking the delay without tracking enqueue timestamps for one or more packets in the particular packet queue.

In an embodiment, tracking the delay comprises recording the delay in a memory or register and updating the recorded delay whenever a packet is dequeued from the particular packet queue, wherein the traffic manager is configured to update recorded delays for different packet queues using a recurring background process that updates only a fraction of the packet queues per each clock cycle of the network device.

In an embodiment, tracking the delay is performed without tracking enqueue timestamps for more than two packets in the particular packet queue, the two packets being the packet at the tail of the particular packet queue and the marker packet.

In an embodiment, the traffic manager is further configured to, or the method further comprises: designating a first packet assigned to the particular packet queue as the marker packet; responsive to the first packet departing the queue, designate a second packet assigned to the particular packet queue as the marker packet, wherein the second packet is not at the head of the particular packet queue.

In an embodiment, the second packet is at the tail of the particular packet queue. In an embodiment, the packet queues are first-in-first-out queues.

In an embodiment, the traffic manager is further configured to, or the method further comprises, annotating the one or more packets with information pertaining to the particular packet queue, the annotated information including at least one or more of a size of the delay, a timestamp associated with the departing one or more packets, a queue id, a device id, a queue size, a buffer size, or a congestion indicator.

In an embodiment, the apparatus is further configured to, or the method further comprises, annotating the one or more packets with information indicating a size of the delay.

In an embodiment, the apparatus is further configured to, or the method further comprises, tracking multiple marker packets within the particular packet queue, wherein a second set of packets assigned to the particular packet queue are not designated as marker packets.

In an embodiment, the monitoring threshold is specific to the particular packet queue, wherein other packet queues have different monitoring thresholds.

In an embodiment, the apparatus is further configured to, or the method further comprises, determining whether to enforce the monitoring threshold on the particular packet queue based on a queue monitoring flag specific to the particular packet queue.

According to an embodiment, an apparatus comprises: one or more network interfaces configured to receive packets over one or more networks; a packet processor configured to assign the packets to packet queues; a traffic manager configured to: based on the packet queues, determine when to process specific packets of the packets, the packets dequeued from the packet queues when processed; track a delay associated with a particular packet queue of the packet queues, the delay based on a duration of time for which a designated marker packet has been in the particular packet queue, another packet being designated as the marker packet whenever the currently designated marker packet departs from the queue; when the delay exceeds an expiration threshold, mark the particular packet queue as expired; while the particular packet queue is marked as expired, drop one or more packets assigned to the particular packet queue, including the designated packet.

According to an embodiment, a method comprises: receiving, at a network device, packets over one or more networks; assigning the packets to packet queues; based on the packet queues, determining when to process specific packets of the packets, the packets dequeued from the packet queues when processed; tracking a delay associated with a particular packet queue of the packet queues, the delay based on a duration of time for which a designated marker packet has been in the particular packet queue, another packet being designated as the marker packet whenever the currently designated marker packet departs from the queue; when the delay exceeds an expiration threshold, marking the particular packet queue as expired; while the particular packet queue is marked as expired, dropping one or more packets assigned to the particular packet queue, including the designated packet.

In an embodiment, the apparatus or network device is a network switch. In an embodiment, the packets are one of: cells, frames, IP packets, or TCP segments.

In an embodiment, the particular packet is not designated as the marker packet.

In an embodiment, dropping the one or more packets comprises dropping packets from the head of the particular packet queue until the queue is empty, the particular packet queue marked as unexpired upon completion of the dropping. In an embodiment, dropping the one or more packets comprises dropping packets from the head of the queue until at least the currently designated marker packet is dropped, the particular packet queue marked as unexpired upon determining that the delay of the particular packet queue no longer exceeds the threshold.

In an embodiment, dropping a given packet comprises disposing of the given packet without forwarding the given packet to an intended destination identified by the given packet. In an embodiment, dropping the one or more packets comprises dropping first packets assigned to the queue before the first packets are added to the queue.

In an embodiment, the traffic manager is further configured to, or the method further comprises, tracking the delay without tracking enqueue timestamps for one or more packets in the particular packet queue.

In an embodiment, tracking the delay is performed without tracking enqueue timestamps for more than two packets in the particular packet queue, the two packets being the packet at the tail of the particular packet queue and the marker packet.

In an embodiment, tracking the delay comprises recording the delay in a memory or register and updating the recorded delay whenever a packet is dequeued from the particular packet queue.

In an embodiment, the traffic manager is further configured to, or the method further comprises, updating recorded delays for different packet queues using a recurring background process that updates only a fraction of the packet queues per each clock cycle of the network device.

In an embodiment, the traffic manager is further configured to, or the method further comprises: designating a first packet assigned to the particular packet queue as the marker packet; responsive to the first packet departing the queue, designating a second packet assigned to the particular packet queue as the marker packet, wherein the second packet is not at the head of the particular packet queue.

In an embodiment, the second packet is at the tail of the particular packet queue. In an embodiment, the packet queues are first-in-first-out queues.

In an embodiment, the traffic manager is further configured to, or the method further comprises, sending the one or more packets that are dropped to a reporting component.

In an embodiment, the traffic manager is further configured to, or the method further comprises, annotating the one or more packets that are dropped with information pertaining to the particular packet queue, the annotated information including at least one or more of the delay, a timestamp associated with dropping the one or more packets, a queue id, a device id, a queue size, a buffer size, or a congestion indicator.

In an embodiment, the traffic manager is further configured to, or the method further comprises, while the particular packet queue is expired, overriding one or both of: a flow control feature or a traffic shaper feature for the particular packet queue.

In an embodiment, the traffic manager is further configured to, or the method further comprises, tracking multiple marker packets within the particular packet queue, wherein a second set of packets assigned to the particular packet queue are not designated as marker packets.

In an embodiment, the expiration threshold is specific to the particular packet queue, wherein other packet queues have different expiration thresholds.

In an embodiment, the traffic manager is further configured to, or the method further comprises, determining whether to enforce the expiration threshold on the particular packet queue based on a queue expiration flag specific to the particular packet queue, wherein the traffic manager is configured not to enforce the expiration threshold on a packet that is marked as ineligible for expiration.

According to an embodiment, an apparatus comprises: one or more network interfaces configured to receive packets over one or more networks; a packet processor configured to: assign the packets to packet queues; responsive to a failure to add a particular packet to a particular packet queue to which the particular packet was assigned, designate a queue forensics feature of the particular packet queue as active; traffic management logic configured to: based on the packet queues, determine when to process specific packets of the received packets, the packets dequeued from the packet queues when processed; while the queue forensics feature of the particular packet queue is designated as active, annotate one or more packets departing from the particular packet queue with a tag indicating that a drop event occurred with respect to the particular packet queue while the one or more packets were in the particular packet queue; deactivate the queue forensics feature when a first packet in the particular packet queue has been dequeued from the particular packet queue; a visibility component configured to, based on the tag and the one or more packets, perform one or more of: changing one or more settings of the apparatus, storing copies of the one or more packets in a log or data buffer, updating packet statistics, or sending copies the one or more packets to an external device for analysis.

According to an embodiment, a method comprises: assigning packets received by a network device to packet queues; based on the packet queues, determining when to process specific packets of the packets received by the network device, the packets dequeued from the packet queues when processed; responsive to a failure to add a particular packet to a particular packet queue to which the particular packet was assigned, designating a queue forensics feature of the particular packet queue as active until a first packet in the particular packet queue has been dequeued from the particular packet queue; while the queue forensics feature of the particular packet queue is designated as active, annotating one or more packets departing from the particular packet queue with a tag indicating that a drop event occurred with respect to the particular packet queue while the one or more packets were in the particular packet queue; sending copies of the one or more packets that were annotated with the tag to a first component configured to, based on the tag and the one or more packets, perform one or more of: changing one or more settings of the apparatus, storing copies of the one or more packets in a log or data buffer, or updating packet statistics.

In an embodiment, the apparatus or network device is a network switch. In an embodiment, the packets are one of: cells, frames, IP packets, or TCP segments.

In an embodiment, the traffic manager is configured to, or the method further comprises, recording an identifier of the first packet in metadata associated with the particular packet queue.

In an embodiment, the traffic manager is configured to, or the method further comprises, selecting the first packet because the first packet is at the tail of the particular packet queue. In an embodiment, the packet queues are first-in-first-out queues.

In an embodiment, the packet processor is configured to, or the method further comprises, reassigning the particular packet to a visibility queue, the visibility component configured to process packets in the visibility queue. In an embodiment, the packet processor is configured to truncate the particular packet before assigning the particular packet to the visibility queue.

In an embodiment, wherein the traffic manager is further configured to, or the method further comprises, forwarding copies of the one or more packets to one or more visibility queues processed by the visibility component, the one or more packets associated with the with the particular packet. In an embodiment, the traffic manager is further configured to, or the method further comprises, annotating the particular packet with a drop event identifier, the one or more packets also annotated with the drop event identifier. In an embodiment, the copies are partial copies including only portions of the one or more packets.

In an embodiment, traffic manager is further configured to, or the method further comprises, annotating the one or more packets with information pertaining to the particular packet queue.

In an embodiment, the traffic manager is further configured to, or the method further comprises, annotating the one or more packets with information associated with the particular packet queue, the annotated information including at least one or more of a delay calculated based on a marker packet within the particular packet queue, a timestamp associated with the drop event, a queue id, a device id, a queue size, a buffer size, or a congestion indicator.

In an embodiment, the packet processor is further configured to, or the method further comprises, enabling the queue forensics feature on the particular packet queue based on a drop visibility monitoring flag specific to the particular packet queue. In an embodiment, the packet processor is further configured to, or the method further comprises, enabling the queue forensics feature on the particular packet queue only at times indicated by a probabilistic sampling function or a rate-aware sampling function.

According to an embodiment, an apparatus comprises: one or more memories and/or registers storing at least: queue data describing a queue of data units, the queue having a head from which data units are dequeued and a tail to which data units are enqueued; a first marker identifier that identifies a data unit, currently within the queue, that has been designated as a first marker; a first marker timestamp that identifies a time at which the data unit designated as the first marker was enqueued; a second marker identifier that identifies a data unit, currently within the queue, that has been designated as a second marker; a second marker timestamp that identifies a time at which the data unit designated as the first marker was enqueued; and a queue delay; queue management logic, coupled to the one or more memories and/or registers, configured to: whenever a data unit that is currently designated as the first marker is dequeued from the head of the queue, set the first marker identifier to the second marker identifier and the first marker timestamp to the second marker timestamp; when a new data unit is added to the tail of the queue, update the second marker timestamp to reflect a time at which the new data unit was enqueued and the second marker identifier to identify the new data unit as the second marker; and repeatedly update the queue delay based on a difference between a current time and the first marker timestamp.

According to an embodiment, a method comprises: storing queue data describing a queue of data units, the queue having a head from which data units are dequeued and a tail to which data units are enqueued; storing a first marker identifier that identifies a data unit, currently within the queue, that has been designated as a first marker; storing a first marker timestamp that identifies a time at which the data unit designated as the first marker was enqueued; storing a second marker identifier that identifies a data unit, currently within the queue, that has been designated as a second marker; storing a second marker timestamp that identifies a time at which the data unit designated as the first marker was enqueued; whenever a data unit that is currently designated as the first marker is dequeued from the head of the queue, setting the first marker identifier to the second marker identifier and the first marker timestamp to the second marker timestamp; when a new data unit is added to the tail of the queue, updating the second marker timestamp to reflect a time at which the new data unit was enqueued and the second marker identifier to identify the new data unit as the second marker; storing a queue delay; repeatedly updating the queue delay based on a difference between a current time and the first marker timestamp.

In an embodiment, the queue management logic is further configured to, or the method further comprises, updating the second marker identifier and second marker timestamp whenever a new data unit is added to the tail of the queue to designate the new data unit as the second marker.

In an embodiment, repeatedly updating the queue delay comprises updating the queue delay whenever a data unit is dequeued from the queue. In an embodiment, repeatedly updating the queue delay comprises executing a background process that updates the queue delay at approximately equal time intervals.

In an embodiment, the apparatus further comprises one or more data unit processors configured to, or the method further comprises, determining when to perform one or more delay-based actions based on a comparison of one or more corresponding thresholds for the one or more delay-based action to the queue delay.

In an embodiment, the queue management logic is further configured to, or the method further comprises, determining when to expire the queue based on the queue delay, the expiring of the queue including one or more of: dropping data units within the queue, preventing new data units from being added to the queue, disabling a flow control policy for the queue, or disabling a traffic shaping policy for the queue.

In an embodiment, the queue management logic is further configured to, or the method further comprises, determining when to tag data units within the queue for monitoring based on the queue delay.

In an embodiment, the one or more memories and/or registers further store, or the method further comprises storing, multiple marker identifiers for multiple markers in between the first marker and the second marker, and multiple marker timestamps corresponding to the multiple marker identifiers.

In an embodiment, updating the queue delay based on a difference between a current time and the first marker timestamp comprises setting the queue delay to the greater of the difference between a current time and the first marker timestamp and a difference between a dequeue time of a most recently dequeued data unit and the first marker timestamp when the most recently dequeued data unit was dequeued.

In an embodiment, the apparatus is a network switch, the apparatus further comprising one or more communication interfaces coupled to one or more networks via which the data units are received, at least some of the data units being forwarded through the network switch to other devices in the one or more networks. In an embodiment, the method is performed by such an apparatus.

In an embodiment, one or more non-transitory computer-readable storage media store instructions that, when executed by one or more computing devices, cause performance of one or more of the methods described herein, and/or cause implementation of one or more of the apparatuses or systems described herein.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques. Such special-purpose computing devices may also combine custom hard-wired logic, ASICs, or FPGAs with custom programming to accomplish the techniques.

Though the foregoing techniques are described with respect to a hardware implementation, which provides a number of advantages in certain embodiments, it will also be recognized that, in another embodiment, the foregoing techniques may still provide certain advantages when performed partially or wholly in software. Accordingly, in such an embodiment, a suitable implementing apparatus comprises a general-purpose hardware processor and is configured to perform any of the foregoing methods by executing program instructions in firmware, memory, other storage, or a combination thereof.

Figure 8:
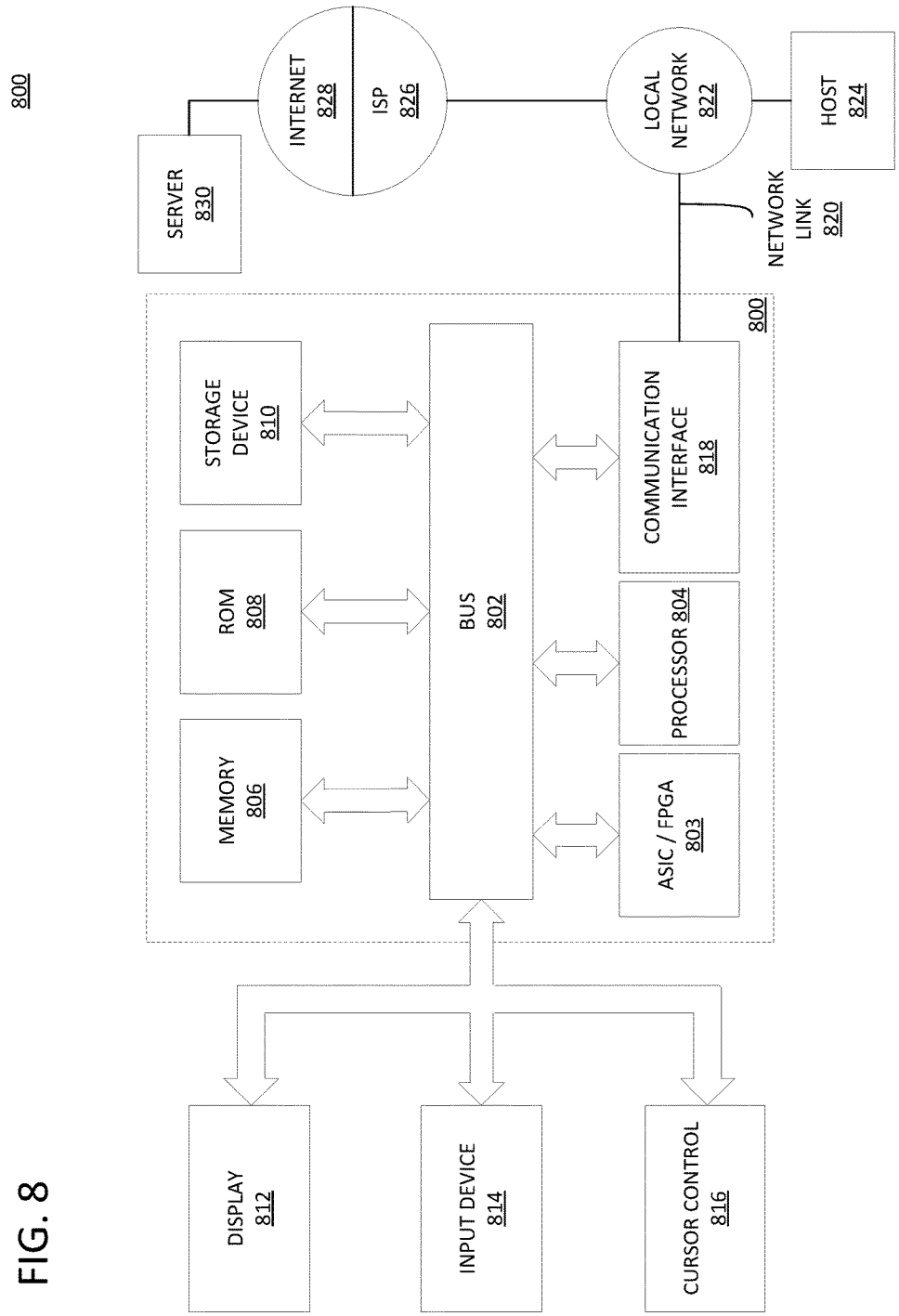
FIG. 8 is block diagram of a computer system upon which embodiments of the inventive subject matter may be implemented.

FIG. 8 is a block diagram that illustrates a computer system 800 that may be utilized in implementing the above-described techniques, according to an embodiment. Computer system 800 may be, for example, a desktop computing device, laptop computing device, tablet, smartphone, server appliance, computing mainframe, multimedia device, handheld device, networking apparatus, or any other suitable device.

Computer system 800 may include one or more ASICs, FPGAs, or other specialized circuitry 803 for implementing program logic as described herein. For example, circuitry 803 may include fixed and/or configurable hardware logic blocks for implementing some or all of the described techniques, input/output (I/O) blocks, hardware registers or other embedded memory resources such as random access memory (RAM) for storing various data, and so forth. The logic blocks may include, for example, arrangements of logic gates, flip-flops, multiplexers, and so forth, configured to generate an output signals based on logic operations performed on input signals.

Additionally, and/or instead, computer system 800 may include one or more hardware processors 804 configured to execute software-based instructions. Computer system 800 may also include one or more busses 802 or other communication mechanism for communicating information. Busses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes one or more memories 806, such as a RAM, hardware registers, or other dynamic or volatile storage device for storing data units to be processed by the one or more ASICs, FPGAs, or other specialized circuitry 803. Memory 806 may also or instead be used for storing information and instructions to be executed by processor 804. Memory 806 may be directly connected or embedded within circuitry 803 or a processor 804. Or, memory 806 may be coupled to and accessed via bus 802. Memory 806 also may be used for storing temporary variables, data units describing rules or policies, or other intermediate information during execution of program logic or instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, may optionally be provided and coupled to bus 802 for storing information and instructions.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as a 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send messages and receive data through the network(s), network link 820, and communication interface 818. In some embodiments, this data may be data units that the computer system 800 has been asked to process and, if necessary, redirect to other computer systems via a suitable network link 820. In other embodiments, this data may be instructions for implementing various processes related to the described techniques. For instance, in the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

Computer system 800 may optionally be coupled via bus 802 to one or more displays 812 for presenting information to a computer user. For instance, computer system 800 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

One or more input devices 814 are optionally coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

As discussed, computer system 800 may implement techniques described herein using customized hard-wired logic, one or more ASICs or FPGAs 803, firmware and/or program logic, which in combination with the computer system causes or programs computer system 800 to be a special-purpose machine. According to one embodiment, however, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus comprising:
    one or more network interfaces configured to receive network packets over one or more networks;
    assignment control logic configured to assign the network packets to packet queues;
    a traffic manager configured to:
        based on the packet queues, determine when to process specific packets of the received network packets, the specific packets dequeued from the packet queues when processed;
        track a delay associated with a particular packet queue of the packet queues, the tracking including designating one of the network packets assigned to the particular packet queue as a marker packet, the delay based on a duration of time for which the currently designated marker packet has been in the particular packet queue, another network packet assigned to the particular packet queue being designated as the marker packet whenever the currently designated marker packet departs from the queue; and
        when the delay exceeds a monitoring threshold, associate one or more network packets departing from the particular packet queue with a tag indicating that the monitoring threshold has been surpassed;
    a visibility component configured to, based on the tag and the one or more network packets, perform one or more of: changing one or more settings of the apparatus, storing copies of the one or more network packets in a log or data buffer, updating packet statistics, or sending copies of the one or more network packets to an external device for analysis.

2. The apparatus of claim 1, wherein the visibility component is configured to change the one or more settings of the apparatus based on the tag and the one or more network packets, wherein changing the one or more settings comprises overriding one or both of: a flow control feature or a traffic shaper feature for the particular packet queue.

3. The apparatus of claim 1, wherein the traffic manager is further configured to compare the delay to a deadline profile associated with the particular packet queue, the deadline profile indicating multiple different deadlines, including the monitoring threshold, each associated with a different delay-based action.

4. The apparatus of claim 1, wherein the traffic manager is configured to track the delay without tracking enqueue timestamps for a first set of network packets in the particular packet queue.

5. The apparatus of claim 1, wherein the traffic manager is configured to update recorded delays for different packet queues using a recurring background process that updates only a fraction of the recorded delays per each clock cycle of the network device.

6. The apparatus of claim 1, wherein tracking the delay is performed without tracking enqueue timestamps for more than two network packets in the particular packet queue, the two network packets being the network packet at the tail of the particular packet queue and the marker packet.

7. The apparatus of claim 1, wherein the traffic manager is further configured to:
    designate a first packet assigned to the particular packet queue as the marker packet;
    responsive to the first packet departing the queue, designate a second packet assigned to the particular packet queue as the marker packet, wherein the second packet is not at the head of the particular packet queue.

8. The apparatus of claim 1, wherein the traffic manager is further configured to annotate the one or more network packets with information pertaining to the particular packet queue, the annotated information including at least one or more of a size of the delay, a timestamp associated with the departing one or more network packets, a queue id, a device id, a queue size, a buffer size, or a congestion indicator.

9. The apparatus of claim 1, wherein the traffic manager is further configured to track multiple marker packets within the particular packet queue, wherein a second set of network packets assigned to the particular packet queue are not designated as marker packets.

10. The apparatus of claim 1, wherein the monitoring threshold is specific to the particular packet queue, wherein other packet queues have different monitoring thresholds.

11. The apparatus of claim 1, wherein the traffic manager is further configured to determine whether to enforce the monitoring threshold on the particular packet queue based on a queue monitoring flag specific to the particular packet queue.

12. The apparatus of claim 1, wherein tracking the delay comprises recording the delay and, with each network packet dequeued from the particular packet queue, updating the recorded delay to reflect the current duration of time for which the currently designated marker packet has been in the particular packet queue.

13. The apparatus of claim 1, wherein tracking the delay comprises, at a first time when a first packet other than the currently designated marker packet is released from the particular packet queue, calculating the delay as a difference between the first time and a time when the currently designated marker packet was enqueued into the particular packet queue.

14. A method comprising:
    assigning network packets received by a network device to packet queues;
    based on the packet queues, determining when to process specific packets of the network packets received by the network device, the specific packets dequeued from the packet queues when processed;
    tracking a delay associated with a particular packet queue of the packet queues, the tracking including designating one of the network packets assigned to the particular packet queue as a marker packet, the delay based on a duration of time for which the currently designated marker packet has been in the particular packet queue, another network packet assigned to the particular packet queue being designated as the marker packet whenever the currently designated marker packet departs from the queue;

when the delay exceeds a monitoring threshold, annotating one or more network packets departing from the particular packet queue with a tag indicating that the monitoring threshold has been surpassed;

sending copies of the one or more network packets that were annotated with the tag to a first component configured to, based on the tag and the one or more packets, perform one or more of: changing one or more network settings of the network device, updating packet statistics for the network device, or storing copies of the one or more network packets in a log or data buffer.

15. The method of claim 14, further comprising: comparing the delay to a deadline profile associated with the particular packet queue, the deadline profile indicating multiple different deadlines, including the monitoring threshold, each associated with a different delay-based action.

16. The method of claim 14, further comprising tracking the delay without tracking enqueue timestamps for a first set of network packets in the particular packet queue.

17. The method of claim 14, further comprising:
designating a first packet assigned to the particular packet queue as the marker packet;
responsive to the first packet departing the queue, designating a second packet assigned to the particular packet queue as the marker packet, wherein the second packet is not at the head of the particular packet queue.

18. The method of claim 14, further comprising annotating the one or more network packets with information pertaining to the particular packet queue, the annotated information including at least one or more of a size of the delay, a timestamp associated with the departing one or more network packets, a queue id, a device id, a queue size, a buffer size, or a congestion indicator.

19. The method of claim 14, further comprising tracking multiple marker packets within the particular packet queue, wherein a second set of network packets assigned to the particular packet queue are not designated as marker packets.

20. The method of claim 14, wherein the monitoring threshold is specific to the particular packet queue, wherein other packet queues have different monitoring thresholds.

21. The method of claim 14, further comprising updating recorded delays for different packet queues using a recurring background process that updates only a fraction of the recorded delays per each clock cycle of the network device.

22. The method of claim 14, wherein tracking the delay comprises recording the delay and, with each network packet dequeued from the particular packet queue, updating the recorded delay to reflect the current duration of time for which the currently designated marker packet has been in the particular packet queue.

23. The method of claim 14, wherein the first component is configured to change the one or more settings of the network device based on the tag and the one or more network packets, wherein changing the one or more settings comprises overriding one or both of: a flow control feature or a traffic shaper feature for the particular packet queue.

24. One or more non-transitory computer-readable media storing instructions that, when executed by one or more computing devices, cause:

assigning network packets received by a network device to packet queues;

based on the packet queues, determining when to process specific packets of the network packets received by the network device, the specific packets dequeued from the packet queues when processed;

tracking a delay associated with a particular packet queue of the packet queues, the tracking including designating one of the network packets assigned to the particular packet queue as a marker packet, the delay based on a duration of time for which the currently designated marker packet has been in the particular packet queue, another network packet assigned to the particular packet queue being designated as the marker packet whenever the currently designated marker packet departs from the queue;

when the delay exceeds a monitoring threshold, annotating one or more network packets departing from the particular packet queue with a tag indicating that the monitoring threshold has been surpassed;

sending copies of the one or more network packets that were annotated with the tag to a first component configured to, based on the tag and the one or more packets, perform one or more of: changing one or more network settings of the network device, updating packet statistics for the network device, or storing copies of the one or more network packets in a log or data buffer.

25. The one or more non-transitory computer-readable media of claim 24, wherein the instructions, when executed by the one or more computing devices, further cause: comparing the delay to a deadline profile associated with the particular packet queue, the deadline profile indicating multiple different deadlines, including the monitoring threshold, each associated with a different delay-based action.

26. The one or more non-transitory computer-readable media of claim 24, wherein the instructions, when executed by the one or more computing devices, further cause tracking the delay without tracking enqueue timestamps for a first se of network packets in the particular packet queue.

27. The one or more non-transitory computer-readable media of claim 24, wherein the instructions, when executed by the one or more computing devices, further cause:
designating a first packet assigned to the particular packet queue as the marker packet;
responsive to the first packet departing the queue, designating a second packet assigned to the particular packet queue as the marker packet, wherein the second packet is not at the head of the particular packet queue.

28. The one or more non-transitory computer-readable media of claim 24, wherein the instructions, when executed by the one or more computing devices, further cause annotating the one or more network packets with information pertaining to the particular packet queue, the annotated information including at least one or more of a size of the delay, a timestamp associated with the departing one or more network packets, a queue id, a device id, a queue size, a buffer size, or a congestion indicator.

29. The one or more non-transitory computer-readable media of claim 24, wherein the instructions, when executed by the one or more computing devices, further cause tracking multiple marker packets within the particular packet queue, wherein a second set of network packets assigned to the particular packet queue are not designated as marker packets.

30. The one or more non-transitory computer-readable media of claim 24, wherein the monitoring threshold is specific to the particular packet queue, wherein other packet queues have different monitoring thresholds.

31. The one or more non-transitory computer-readable media of claim 24, wherein the instructions, when executed by the one or more computing devices, further cause updating recorded delays for different recorded delays using a recurring background process that updates only a fraction of the recorded delays per each clock cycle of the network device.

32. The one or more non-transitory computer-readable media of claim 24, wherein tracking the delay comprises recording the delay and, with each network packet dequeued from the particular packet queue, updating the recorded delay to reflect the current duration of time for which the currently designated marker packet has been in the particular packet queue.

33. The one or more non-transitory computer-readable media of claim 24, wherein the first component is configured to change the one or more settings of the network device based on the tag and the one or more network packets, wherein changing the one or more settings comprises overriding one or both of: a flow control feature or a traffic shaper feature for the particular packet queue.

* * * * *

UNITED STATES PATENT AND TRADEMARK OFFICE
CERTIFICATE OF CORRECTION

PATENT NO. : 10,277,518 B1
APPLICATION NO. : 15/407149
DATED : April 30, 2019
INVENTOR(S) : Matthews et al.

Page 1 of 1

It is certified that error appears in the above-identified patent and that said Letters Patent is hereby corrected as shown below:

In the Claims

Column 47
Claim 31: Line 6: Delete "recorded delays" and insert --packet queues--

Signed and Sealed this
Fourth Day of June, 2019

Andrei Iancu
*Director of the United States Patent and Trademark Office*